(12) United States Patent
Kasahara et al.

(10) Patent No.: US 10,228,994 B2
(45) Date of Patent: Mar. 12, 2019

(54) INFORMATION PROCESSING SYSTEM, INFORMATION PROCESSING METHOD, AND PROGRAM

(71) Applicant: NEC Corporation, Tokyo (JP)

(72) Inventors: Shinji Kasahara, Tokyo (JP); Katsuhiro Ochiai, Tokyo (JP)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 14/916,007

(22) PCT Filed: Mar. 11, 2014

(86) PCT No.: PCT/JP2014/056334
§ 371 (c)(1),
(2) Date: Mar. 2, 2016

(87) PCT Pub. No.: WO2015/033603
PCT Pub. Date: Mar. 12, 2015

(65) Prior Publication Data
US 2016/0196175 A1    Jul. 7, 2016

(30) Foreign Application Priority Data
Sep. 9, 2013   (JP) .................................. 2013-185947

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01); *G06F 11/0706* (2013.01); *G06F 11/0751* (2013.01)

(58) Field of Classification Search
CPC .. G06F 11/079; G06F 11/076; G06F 11/0751; G06F 11/0706

(Continued)

(56) References Cited

U.S. PATENT DOCUMENTS 5,363,415 A * 11/1994 Iwasaki ............... H04L 27/2273
                                                            329/304
5,623,609 A *  4/1997 Kaye ....................... G10L 15/04
                                                            704/1

(Continued)

FOREIGN PATENT DOCUMENTS

EP      03045889 A1    7/2016
JP      6-281547 A    10/1994

(Continued)

OTHER PUBLICATIONS

Japanese Office Action issued by the Japan Patent Office for Japanese Application No. 2015-535335 dated Oct. 3, 2017 (4 pages).

(Continued)

*Primary Examiner* — Yair Leibovich
(74) *Attorney, Agent, or Firm* — Wilmer Cutler Pickering Hale and Dorr LLP

(57) ABSTRACT

An information processing system, an information processing method, and a program capable of satisfactory data analysis are provided. The information processing system includes a frequency conversion unit 205 which converts a plurality of pieces of time-series data obtained through detection carried out by a plurality of sensing units 201 into pieces of frequency data 208, respectively, a model construction unit 211 which generates a correlation model 213 using pieces of the frequency data 208 for at least two sensing units 201 from among the plurality of sensing units 201 and calculates a correlation strength 214 of the correlation model 213, and an error detection unit which determines whether an error has occurred based on the correlation strength 214.

10 Claims, 24 Drawing Sheets

(58) Field of Classification Search
USPC .......................................................... 714/49
See application file for complete search history.

(56) References Cited

U.S. PATENT DOCUMENTS

| | | | | |
|---|---|---|---|---|
| 6,700,615 | B1* | 3/2004 | Satoh | H04N 5/23212 |
| | | | | 348/345 |
| 2003/0018442 | A1* | 1/2003 | Yamaguchi | G06F 17/15 |
| | | | | 702/69 |
| 2003/0169928 | A1* | 9/2003 | Stanek | G06K 9/58 |
| | | | | 382/232 |
| 2009/0092258 | A1* | 4/2009 | Merimaa | H04S 7/30 |
| | | | | 381/1 |
| 2009/0171671 | A1* | 7/2009 | Seo | G10L 25/69 |
| | | | | 704/500 |
| 2009/0217099 | A1 | 8/2009 | Kato | |
| 2010/0149073 | A1* | 6/2010 | Chaum | G02B 27/0093 |
| | | | | 345/8 |
| 2011/0225462 | A1 | 9/2011 | Kato | |
| 2011/0246837 | A1 | 10/2011 | Kato | |
| 2012/0192014 | A1 | 7/2012 | Kato | |
| 2013/0132385 | A1 | 5/2013 | Bullotta et al. | |
| 2015/0113329 | A1 | 4/2015 | Kato | |
| 2015/0213152 | A1 | 7/2015 | Bullotta et al. | |
| 2016/0161339 | A1* | 6/2016 | Tan | G01J 5/0025 |
| | | | | 702/150 |
| 2016/0196175 | A1 | 7/2016 | Kasahara et al. | |
| 2016/0274965 | A1 | 9/2016 | Kato | |
| 2017/0017698 | A1 | 1/2017 | Bullotta et al. | |

FOREIGN PATENT DOCUMENTS

| | | | |
|---|---|---|---|
| JP | 7-006882 | B2 | 1/1995 |
| JP | 2001-198498 | A | 7/2001 |
| JP | 3321487 | B2 | 9/2002 |
| JP | 3780299 | B1 | 5/2006 |
| JP | 3864722 | B2 | 1/2007 |
| JP | 2008-033532 | A | 2/2008 |
| JP | 2009-187293 | A | 8/2009 |
| JP | 2009-199533 | A | 9/2009 |
| JP | 2010-066244 | A | 3/2010 |
| JP | 4872944 | B2 | 2/2012 |
| JP | 2012-098149 | A | 5/2012 |
| JP | 4942353 | B2 | 5/2012 |

OTHER PUBLICATIONS

Extended European Search Report issued by the European Patent Office for European Application No. 14842340.3 dated Jul. 12, 2017 (8 pages).

International Search Report corresponding to PCT/JP2014/056334, dated Jun. 3, 2014 (5 pages).

* cited by examiner

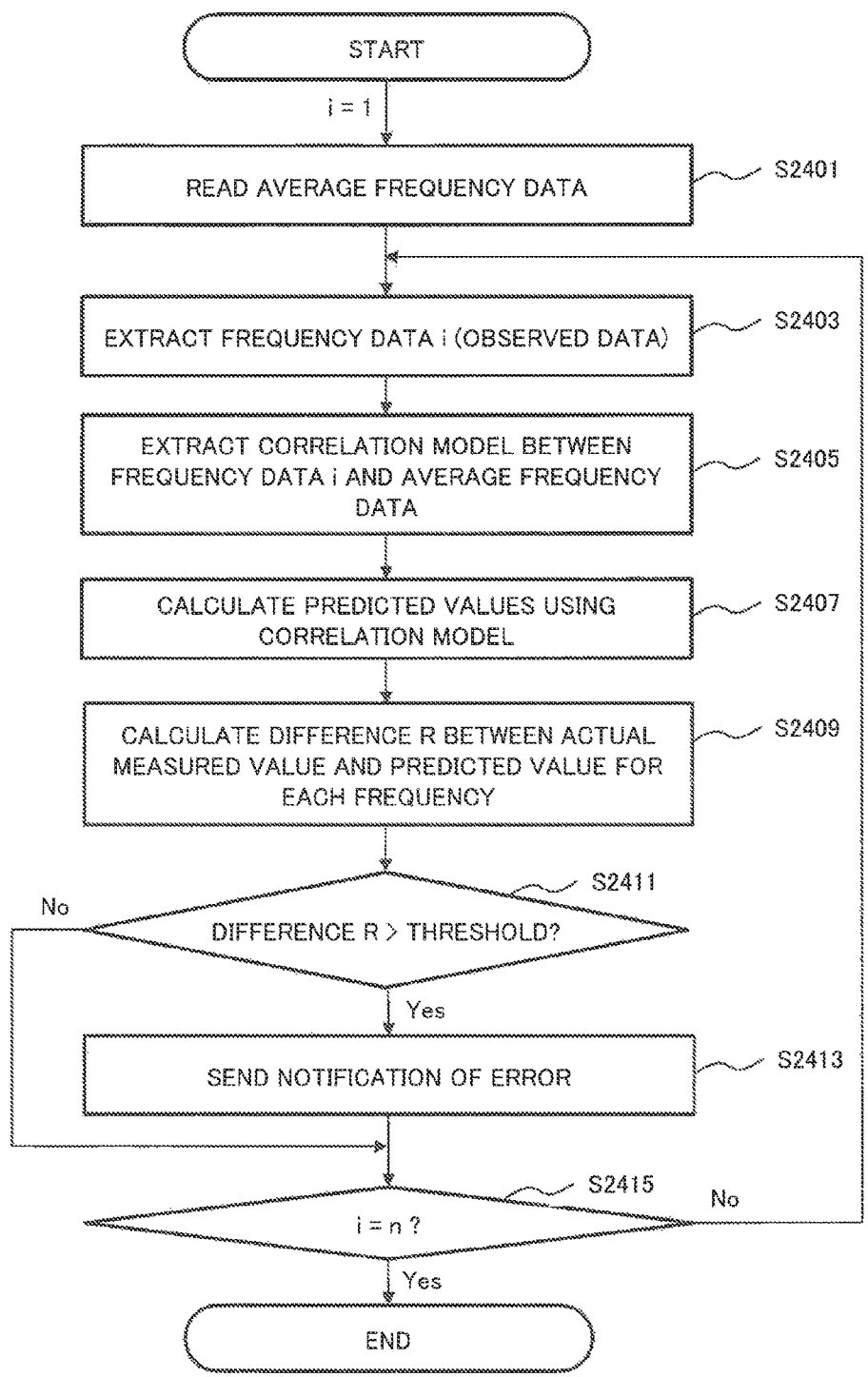

INFORMATION PROCESSING SYSTEM, INFORMATION PROCESSING METHOD, AND PROGRAM

CROSS-REFERENCE TO RELATED APPLICATIONS

This application is a national stage application of International Application No. PCT/JP2014/056334 entitled "Information Processing System, Information Processing Method, and Program," filed on Mar. 11, 2014, which claims priority to Japanese Patent Application No. 2013-185947, filed on Sep. 9, 2013, the disclosures of each which are hereby incorporated by reference in their entirety

TECHNICAL FIELD

Certain aspects of the present invention relate to an information processing system, an information processing method, and a program.

BACKGROUND ART

In recent years, with the development of information processing systems such as computers, the number of systems which collect various types of data such as sounds or vibration and analyze these types of data is growing. PTL 1, for example, discloses a device capable of obtaining a plurality of pieces of performance information from a plurality of devices to be managed which constitute such a system, and deriving coefficients of correlation functions between pieces of performance series information representing time-series variations of the pieces of performance information obtained at a predetermined interval, thereby specifying the position where an error has occurred in accordance with changes in correlation function. PTL 2 discloses collecting sound data generated from facilities, and obtaining the frequency spectrum of the collected data, thereby determining whether an error has occurred based on the correlation coefficients of spectral values.

CITATION LIST

Patent Literature

PTL 1: Japanese Patent Publication No. 4872944
PTL 2: Japanese Patent Application Laid-Open Publication No. 2010-066244

SUMMARY OF INVENTION

Technical Problem

However, when the technique described in PTL 1 is used to extract correlation between pieces of time-series data obtained at a predetermined sampling rate for pieces of data such as vibration, light, or sounds, the coefficients of correlation functions or the correlation strengths of correlation models to be calculated often change only due to the differences in data obtaining period of time. It is, therefore, difficult to generate significant models.

In the technique described in PTL 2 for frequency analysis of data, although an error is detected using correlation coefficients, the correlation coefficients have signs that vary depending on whether the values change in the direction of increase or decrease. Thus, satisfactory analysis is difficult unless pieces of sensor data or frequency ranges having the same changing trend are selected.

Certain aspects of the present invention have been carried out in consideration of the above-described problems. It is an exemplary object of the present invention to provide an information processing system, an information processing method, and a program capable of satisfactory data analysis.

Solution to Problem

An information processing system according to an exemplary aspect of the invention includes: a conversion means for converting a plurality of pieces of time-series data obtained through detection carried out by a plurality of sensors into pieces of first frequency data, respectively; a first model generation means for generating a first correlation model using pieces of the first frequency data for at least two sensors from among the plurality of sensors; a first calculation means for calculating a correlation strength of the first correlation model; and a determination means for determining whether an error has occurred based on the correlation strength.

An information processing system according to an exemplary aspect of the invention includes: a conversion means for converting a plurality of pieces of time-series data obtained through detection carried out by a plurality of sensors into pieces of first frequency data, respectively; a model generation means for generating a correlation model using pieces of the first frequency data for at least two sensors from among the plurality of sensors; and a determination means for determining whether an error has occurred based on a difference between a predicted value of a piece of second frequency data and an actual measured value of the piece of second frequency data, the predicted value of the piece of the second frequency data being obtained by applying the piece of the second frequency data to the correlation model, the piece of the second frequency data being obtained by converting another piece of time-series data obtained from a sensor with respect to the correlation model.

An information processing method performed by an information processing system according to an exemplary aspect of the invention includes: a step for converting a plurality of pieces of time-series data obtained through detection carried out by a plurality of sensors into pieces of first frequency data, respectively; a step for generating a first correlation model using pieces of the first frequency data for at least two sensors from among the plurality of sensors; a step for calculating a correlation strength of the first correlation model; and a step for determining whether an error has occurred based on the correlation strength.

An information processing method performed by an information processing system according to an exemplary aspect of the invention includes: a step for converting a plurality of pieces of time-series data obtained through detection carried out by a plurality of sensors into pieces of first frequency data, respectively; a step for generating a correlation model using pieces of the first frequency data for at least two sensors from among the plurality of sensors; and a step for determining whether an error has occurred based on a difference between a predicted value of a piece of second frequency data and an actual measured value of the piece of second frequency data, the predicted value of the second frequency data being obtained by applying the piece of the second frequency data to the correlation model, the piece of the second frequency data being obtained by converting another piece of time-series data obtained from a sensor with respect to the correlation model.

A program according to an exemplary aspect of the invention causes a computer to execute processes including: a process for converting a plurality of pieces of time-series data obtained through detection carried out by a plurality of sensors into pieces of first frequency data, respectively; a process for generating a first correlation model using pieces of the first frequency data for at least two sensors from among the plurality of sensors; a process for calculating a correlation strength of the first correlation model; and a process for determining whether an error has occurred based on the correlation strength.

A program according to an exemplary aspect of the invention causes a computer to execute processes including: a process for converting a plurality of pieces of time-series data obtained through detection carried out by a plurality of sensors into pieces of first frequency data, respectively; a process for generating a correlation model using pieces of the first frequency data for at least two sensors from among the plurality of sensors; and a process for determining whether an error has occurred based on a difference between a predicted value of a piece of second frequency data and an actual measured value of the piece of second frequency data, the predicted value of the piece of the second frequency data being obtained by applying the piece of the second frequency data to the correlation model, the piece of the second frequency data being obtained by converting another piece of time-series data obtained from a sensor with respect to the correlation model.

In the present invention, "units", "means", "devices or apparatuses", or "systems" not only mean physical means but also includes software for implementing the functions of the "units", "means", "devices or apparatuses", or "systems." Further, the function of one "unit", "means", "apparatus or device", or "system" may be implemented by at least two physical means or devices or apparatuses, or the functions of at least two "units", "means", "devices or apparatuses", or "systems" may be implemented by a single physical means or device or apparatus.

Advantageous Effects of Invention

The present invention provides an information processing system, an information processing method, and a program capable of satisfactory data analysis.

BRIEF DESCRIPTION OF DRAWINGS

FIG. 24 is a flowchart illustrating the sequence of another processing by the information processing system illustrated in FIG. 22.

DESCRIPTION OF EMBODIMENTS

Figure 1:
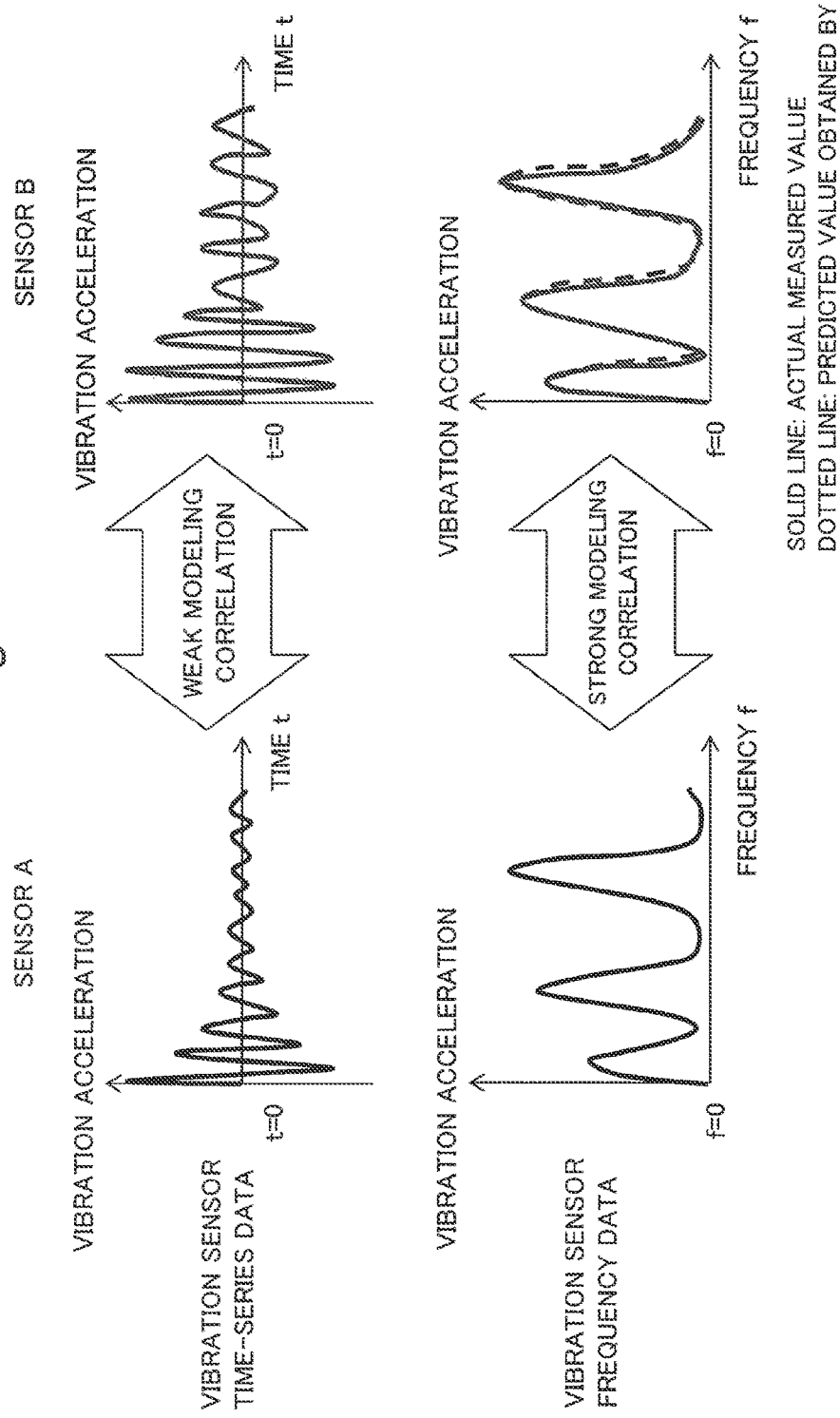
FIG. 1 is a diagram for explaining a specific example of an overview of processing by an information processing system according to a first exemplary embodiment.

Exemplary embodiments of the present invention will be described below. In the following description and drawings to be referred to, the same or similar reference numerals denote the same or similar configurations.

(1 First Exemplary Embodiment)

FIGS. 1 to 10 are diagrams for explaining a first exemplary embodiment. The present exemplary embodiment will be described below with reference to these diagrams, in accordance with the following procedure. An overview of a method for analyzing data in the present exemplary embodiment will be described first in "1.1". An overview of, for example, the configuration of an information processing system in the present exemplary embodiment will be described in "1.2", and an overview of the functional configuration of the information processing system in the present exemplary embodiment will then be described in "1.3". The sequence of processing will be described with reference to a specific example in "1.4". A specific example of a hardware configuration capable of implementing the information processing system will be described in "1.5". Advantageous effects and the like according to the present exemplary embodiment will be described lastly in "1.6".

(1.1 System Configuration and Overview)

(1.1.1 Overview)

A relatively large-scale system such as a corporate information system or a data center is provided with an integrated operational management system for monitoring, controlling, and operating various systems. With an increase in scale of IT systems, and an improvement in level of monitoring as a measure against accidents at the time of disasters such as earthquakes, the scales of state monitoring systems in plants which handle physical data or manufacturing sites are increasing. Although such systems have conventionally been operated in accordance with rules manually determined by administrators, systems or apparatuses growing larger in scale and complexity are becoming more difficult to operate each day. In other words, a demand has risen for systems which detect errors.

In view of this, the information processing system according to the present exemplary embodiment obtains pieces of data such as vibration, sounds, or light using, for example, sensors and analyzes these pieces of data to detect an error in the system. In particular, since the information processing system according to the present exemplary embodiment analyzes data after frequency conversion pre-processing of pieces of time-series data obtained from the sensors, correlation between different sensors can be modeled using pieces of data showing essential changes in frequency. In addition, the information processing system according to the present exemplary embodiment, after frequency conversion of pieces of data to be analyzed, identifies correlation between the pieces of data using correlation models instead of correlation coefficients. This makes it possible to detect an error in response to changes in correlation, regardless of the increasing or decreasing trends of the pieces of frequency data.

A description will be given in more detail below with reference to FIGS. 1 and 2.

Correlation will be described first. During simultaneous measurement of pieces of data by at least two sensors, the pieces of data measured by one sensor and another sensor generally have some correlation in the normal state, although they have different strengths. The relationship in which one increases as the other increases or one decreases as the other decreases will be referred to as "correlation" hereinafter in the present exemplary embodiment.

As described earlier, the information processing system according to the present exemplary embodiment generates correlation models between sensors from pieces of frequency data obtained by converting pieces of time-series data obtained by detecting sounds, light, vibration, or the like by the sensors. The correlation model can be expressed as, for example:

$$a_0 s_x(f_0) + a_1 s_x(f_1) + \ldots\ a_n s_x(f_n) + C = b_0 s_y(f_0) + b_1 s_y(f_1) + \ldots b_m s_y(f_m)$$

Expression 1 where $f_0$ to $f_n$ and $f_0$ to $f_m$ are predetermined frequencies; $s_x(f)$ and $s_y(f)$ are the strengths for the frequency f, of pieces of frequency data (obtained by converting pieces of time-series data) obtained from sensors x and y, respectively; and $a_0$ to $a_n$, $b_0$ to $b_m$, and C are coefficients. Processing for obtaining correlation models is equivalent to determining the coefficients $a_0$ to $a_n$, $b_0$ to $b_m$, and C.

After correlation models have been obtained, a predicted value $s_y(f_m)'$ for the strength at the frequency $f_m$ can be obtained by inputting, for example, the strengths $s_x(f_0)$ to $s_x(f_n)$ in the pieces of frequency data obtained from the sensor x and the strengths $s_y(f_0)$ to $s_y(f_{m-1})$ for the frequencies $f_0$ to $f_{m-1}$ obtained from the sensor y. Predicted values for the frequencies $f_0$ to $f_{m-1}$ can be calculated in the same way.

The correlation varies in strength. A variety of indices may be used to determine the variations in strength of correlation (to be also referred to as the correlation strength hereinafter). For example, a value proportional to the sum of prediction errors between generated predicted values and observed values can be used for normal data used in model generation. In other words, the correlation strength is given by, for example:

Expression 2

$$\sum_f |s_y(f) - s_y(f)'|$$

where $s_y(f)$ is the actual measured value of the strength of a piece of frequency data for the frequency f; and $s_y(f)'$ is the predicted value for the strength of the piece of frequency data for the frequency f, which is calculated using the correlation model. The information processing system according to the present exemplary embodiment generates correlation models for normal data and observed data, respectively, and compares the correlation strength of the correlation model for the normal data with that of the correlation model for the observed data to determine whether an error has occurred.

Considering such an index defined as a correlation strength, when, for example, pieces of time-series data are obtained from a vibration sensor A and a sensor B, even if the correlation of vibration acceleration at each time t is weak, as illustrated in the upper part of FIG. 1, the correlation for each frequency may be strong, as illustrated in the lower part of FIG. 1, upon conversion of each piece of data into a piece of frequency data. In view of this, in the present exemplary embodiment, pieces of time-series data are converted into pieces of frequency data to generate correlation models representing correlation between the pieces of frequency data for respective sensors. An error is detected in accordance with whether the correlation has broken down.

Figure 2:
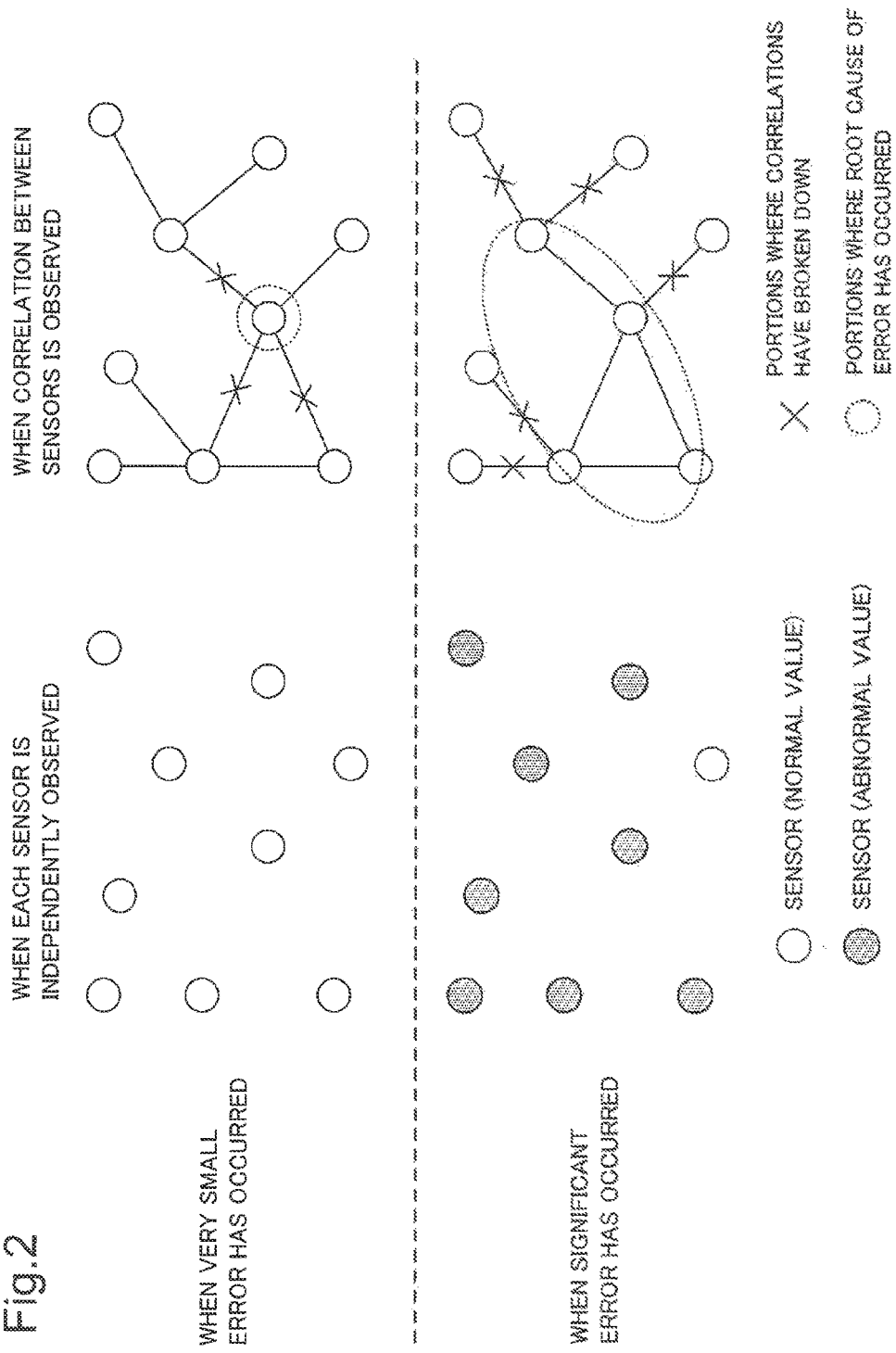
FIG. 2 is a diagram for explaining another specific example of an overview of processing by the information processing system according to the first exemplary embodiment.

A specific example is illustrated in FIG. 2. FIG. 2 shows independent observation of each sensor on the left side and observation of correlation between the sensors, as in the present exemplary embodiment, on the right side. In independent observation of each sensor, when a very small error has occurred, this sensor generally outputs an observed value which falls within the normal range (normal value), and it is highly probable that none of the sensors can detect the error, as illustrated on the upper left of FIG. 2.

In observation of correlation between the sensors, it may be possible to detect an error because the correlation between one sensor and another sensor may have broken down, as illustrated on the upper right of FIG. 2. Especially when only the correlations between one specific sensor and some of the remaining sensors have broken down, it may be possible to detect an error to be observed in the specific sensor.

Further, in independent observation of each sensor, when a large error has occurred, a large number of sensors generally output values which fall outside the normal range (abnormal values), as illustrated on the lower left of FIG. 2. In this case, it is difficult to specify the position where an essential error has occurred.

In observation of the correlation strengths of pieces of data between the sensors, the correlation strengths between sensors which fall within a predetermined range may show no significant changes, as illustrated on the lower right of FIG. 2. In such a case, a region surrounded by portions where the correlations have broken down is expected to have an error cause.

As described above, the information processing system according to the present exemplary embodiment generates correlation models representing correlation using pieces of frequency data obtained by converting pieces of time-series data obtained from respective sensors and detects an error in accordance with whether the correlations of the correlation models have broken down.

It can be determined whether the correlations have broken down, using an index defined as the correlation strengths of correlation models between respective sensors. When a significant difference has occurred between the correlation strength of a correlation model generated using normal data and that of a correlation model generated using data to be observed, an error state in which the correlation has broken down can be detected.

A correlation model used for error detection can be generated even if two pieces of data have different changing trends. Thus, since the correlation strength between the two pieces of data is also independent of their changing trends, it is suitably possible to generate correlation models even between pieces of data obtained from different sensors and calculate their correlation strengths. Pieces of sensor data having concentrated errors can be narrowed down as the root cause of an error by exhaustively performing such processing among a plurality of sensors.

(1.1.2 System Configuration)

Figure 3:
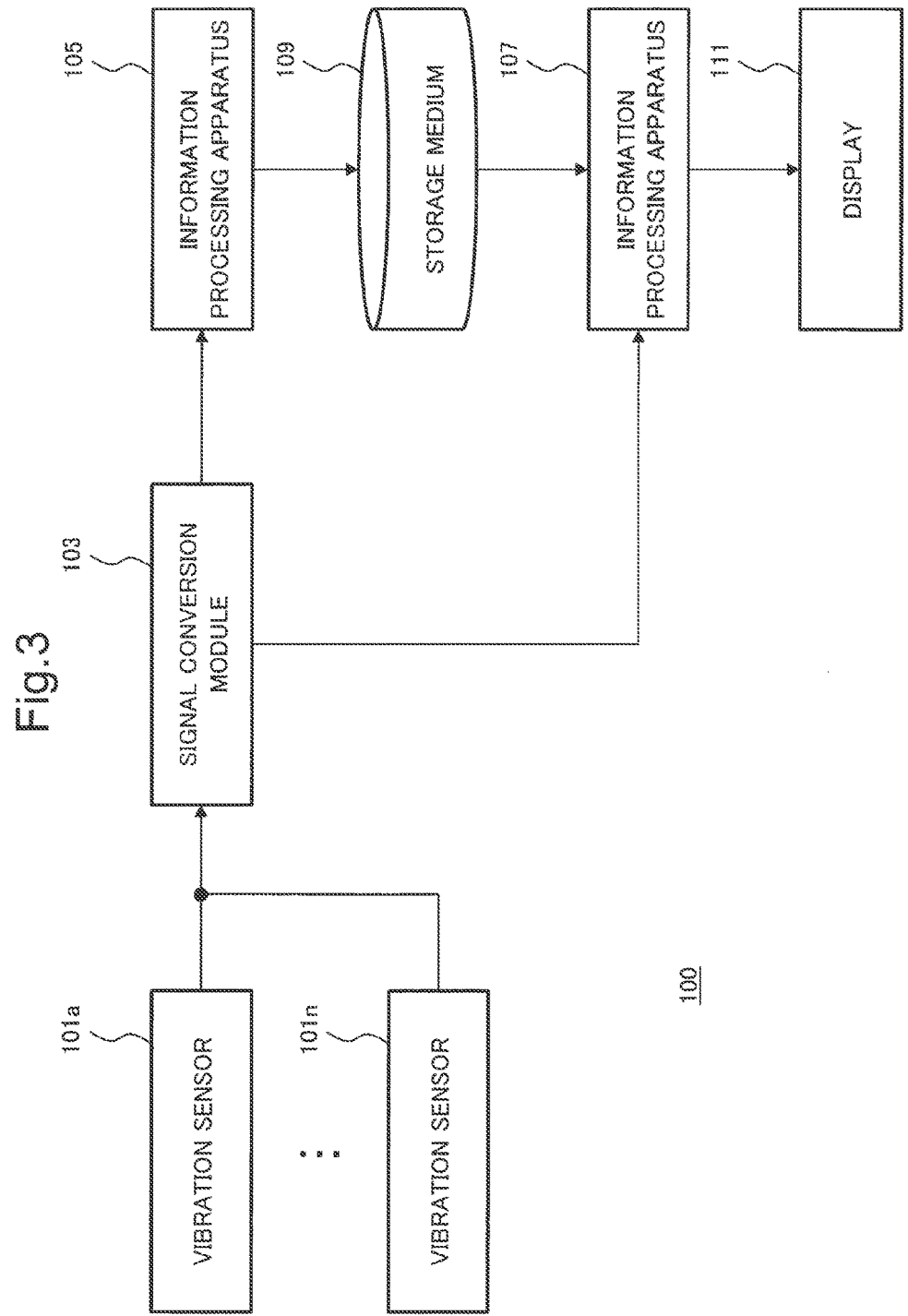
FIG. 3 is a block diagram illustrating a specific example of the configuration of the information processing system according to the first exemplary embodiment.

A specific example of the configuration of an information processing system 100 according to the present exemplary embodiment will be described first with reference to FIG. 3. The information processing system 100 according to the specific example includes vibration sensors 101a to 101n (to be also collectively referred to as vibration sensors 101 hereinafter), a signal conversion module 103, information processing apparatuses 105 and 107 which are computers such as personal computers or servers, a storage medium 109, and a display 111, as illustrated in FIG. 3.

The vibration sensors 101 are, for example, sensors located at different positions and observe pieces of time-series data. Although the vibration sensors 101 detect signals in this case, the present invention is not limited to this, and they may observe pieces of time-series data such as sounds or light instead of vibration.

The signal conversion module 103 converts pieces of time-series analog data detected by the vibration sensors 101 into pieces of digital data which can be processed by the information processing apparatuses 105 and 107 and further converts the pieces of time-series digital data into pieces of frequency data. The pieces of converted frequency data are output to the information processing apparatuses 105 and 107. The information processing apparatus 105 generates correlation models from pieces of frequency data obtained by converting pieces of sensor data turned into digital signals, and outputs the correlation models to the storage medium 109.

The storage medium 109 which is, for example, an HDD (Hard Disk Drive) or a flash memory and stores the correlation models, as described earlier. The storage medium 109 may also be included in the information processing apparatus 105 or 107.

In response to input of a piece of frequency data obtained by converting a piece of new sensor data detected by each vibration sensor 101, the information processing apparatus 107 performs error detection processing using the pieces of frequency data and pieces of model information stored in the storage medium 109. The display 111 displays an error detection result obtained by the information processing apparatus 107.

Although a system includes the two information processing apparatuses 105 and 107 in the present exemplary embodiment, the present invention is not limited to this, and the system may be implemented with one information processing apparatus or three or more information processing apparatuses. The display 111 may be included in the information processing apparatus 107.

(1.2 Functional Configuration)

Figure 4:
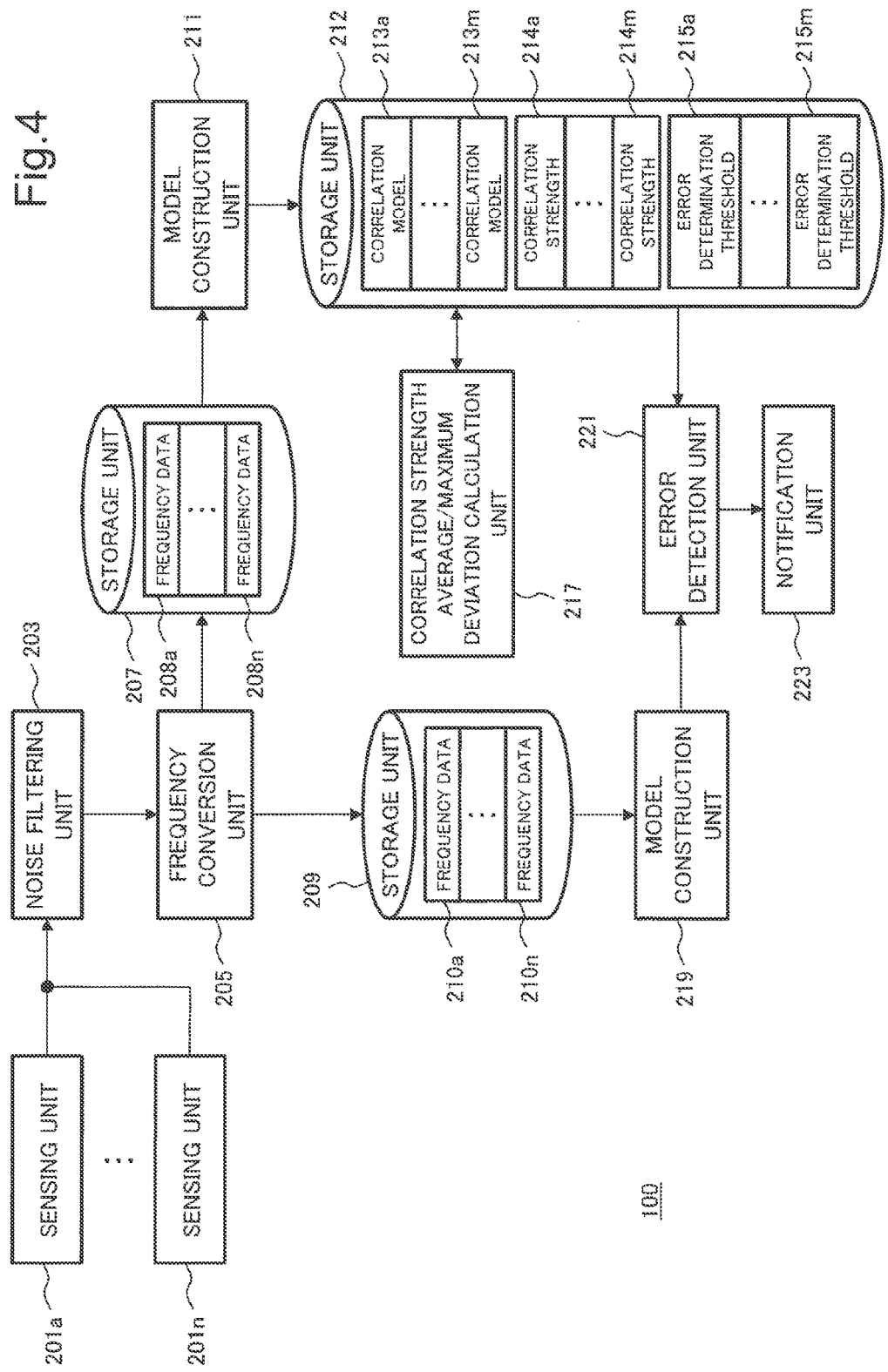
FIG. 4 is a block diagram illustrating a specific example of the functional configuration of the information processing system illustrated in FIG. 3.

The functional configuration of the information processing system 100 will be described next with reference to FIG. 4. The information processing system 100 according to the present exemplary embodiment includes sensing units 201a to 201n (to be also collectively referred to as sensing units 201 hereinafter), a noise filtering unit 203, a frequency conversion unit 205, storage units 207 and 209, model construction units 211 and 219, a storage unit 212, a correlation strength average/maximum deviation calculation unit 217, an error detection unit 221, and a notification unit 223, as illustrated in FIG. 4. The sensing units 201 correspond to the vibration sensors 101 illustrated in FIG. 3. The noise filtering unit 203 and the frequency conversion unit 205 correspond to the signal conversion module 103 illustrated in FIG. 1, and the storage unit 207, the model construction unit 211, and the correlation strength average/maximum deviation calculation unit 217 correspond to the information processing apparatus 105 illustrated in FIG. 1. The storage unit 212 corresponds to the storage medium 109 illustrated in FIG. 1, and the storage unit 209 and the error detection unit 221 correspond to the information processing apparatus 107 illustrated in FIG. 1. The notification unit 223 corresponds to the display 111.

The sensing units 201 detect vibration, light, or sounds and generate and output pieces of time-series data. In the present exemplary embodiment, the sensing units 201 generate and output pieces of time-series data at least at two timings: in the normal state and the state for which it is unclear whether the state is normal or not (error detection target). In the present exemplary embodiment, the number n of sensing units 201 may be any number greater than one.

The noise filtering unit 203 removes noise from the pieces of time-series data output from the sensing units 201. The frequency conversion unit 205 converts the pieces of time-series data that are respectively detected by the sensing units 201a to 201n and have their noise removed, into pieces of frequency data 208a to 208n (to be also collectively referred to as pieces of frequency data 208 hereinafter), respectively, or pieces of frequency data 210a to 210n (to be also collectively referred to as pieces of frequency data 210 hereinafter), respectively. The pieces of frequency data 208 and 210 are, for example, pieces of data detected at different timings. The pieces of frequency data 208 are pieces of normal data for generating correlation models 213 and the pieces of frequency data 210 are pieces of observed data for detecting an error based on the correlation models 213. The pieces of frequency data 208 and 210 are stored in the storage units 207 and 209, respectively.

The model construction unit 211 generates each of correlation models 213a to 213m (to be also collectively referred to as correlation models 213 hereinafter) from a corresponding combination of two pieces of frequency data from among the pieces of frequency data 208a to 208n that are pieces of normal data. The generated correlation models 213 are stored in the storage unit 212. The model construction unit 211 additionally stores correlation strengths 214a to 214m of the correlation models 213a to 213m, respectively, in the storage unit 212.

When a piece of frequency data 208 has been observed a plurality of times for each sensing unit 201, the model construction unit 211 can generate correlation models 213 and correlation strengths 214 equal in number to the plurality of times, for each combination of sensing units 201. The correlation strength average/maximum deviation calculation unit 217 obtains the average of correlation strengths 214 equal in number to the plurality of times for each sensing unit 201 to calculate a maximum deviation. The maximum deviation corresponds to the maximum value of the differences between the average of the correlation strengths 214 and each of the correlation strengths 214 used to calculate this average for the respective correlation models 213. The maximum deviation may be stored in the storage unit 212 as an error determination threshold 215 used for error determination.

The correlation strength average/maximum deviation calculation unit 217 is unnecessary when generation of a correlation model 213 and calculation of a correlation strength 214 are performed only once for each combination of sensing units 201.

The model construction unit 219 also generates a correlation model from each combination of two pieces of frequency data from among the pieces of frequency data 210a to 210n that are pieces of observed data and calculates the correlation strength of each correlation model, like the model construction unit 211.

The error detection unit 221 detects an error by a comparison between the correlation strength 214 of the correlation model 213 generated based on the pieces of frequency data 208 that are pieces of normal data and the correlation strength of the correlation model generated based on the pieces of the frequency data 210 that are pieces of observed data. When, for example, the difference between the correlation strength 214 of the correlation model 213 generated based on the pieces of frequency data 208 and the correlation strength of the correlation model generated based on the pieces of frequency data 210 is greater than the error determination threshold 215, the error detection unit 221 determines that the correlation has broken down (an error has occurred). As the correlation strengths to be compared, the correlation strengths of correlation models for the same combination of sensing units 201 are used.

The notification unit 223 notifies the user of an error detection result obtained by the error detection unit 221. As a method for notification by the notification unit 223, the notification unit 223 may, for example, display a message on the display 111.

(1.3 Sequence of Processing)

The sequence of processing by the information processing system 100 according to the present exemplary embodiment will be described below with reference to FIGS. 5 to 9. FIGS. 5 to 9 are flowcharts each illustrating the sequence of processing by the information processing system 100.

Note that respective processing steps (to be described later) may be executed in parallel or after being rearranged in arbitrary order within the range in which processing details involve no contradiction. Furthermore, other steps may be added between successive processing steps. Moreover, a step described as one step for the sake of convenience may be divided into a plurality of steps and executed or steps described as a plurality of divided steps for the sake of convenience may be executed as one step. The same applies to second and subsequent exemplary embodiments.

(1.3.1 Sequence of Overall Processing)

Figure 5:
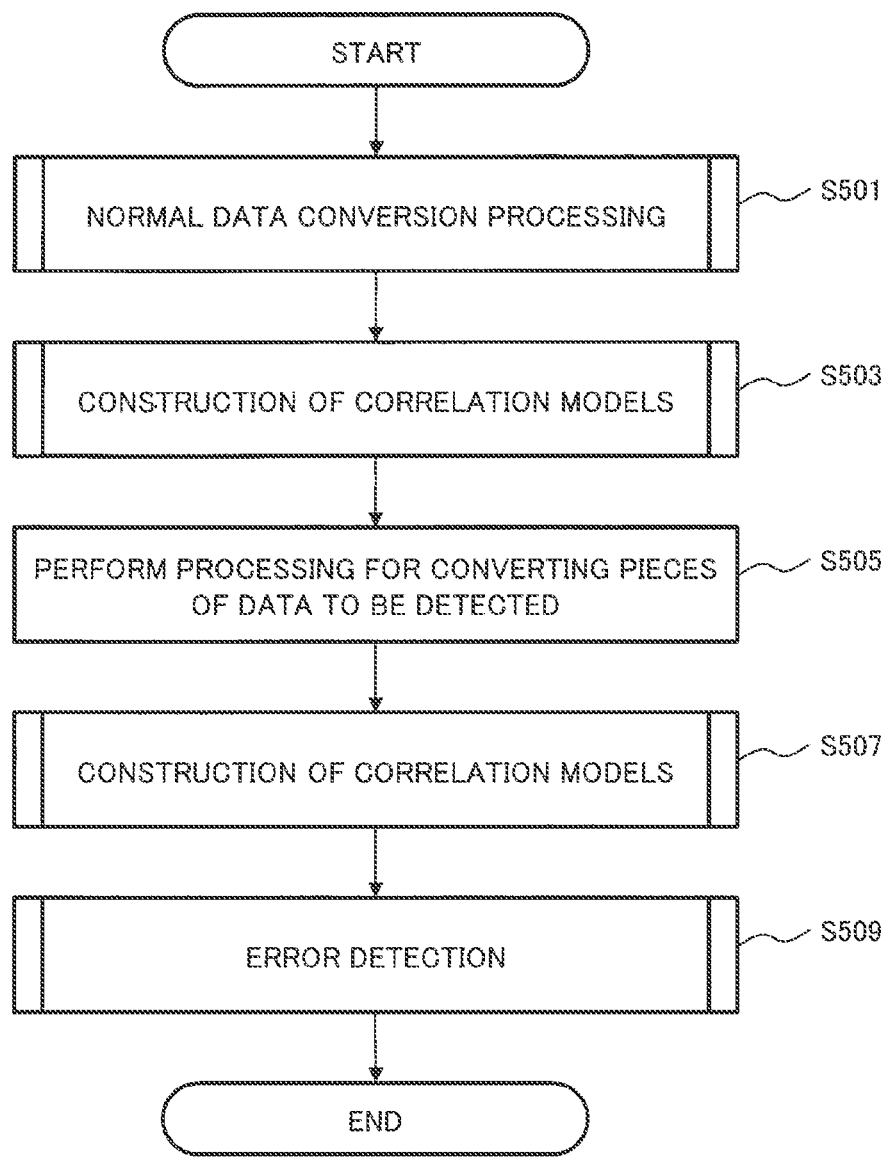
FIG. 5 is a flowchart illustrating the sequence of processing by the information processing system illustrated in FIG. 3.

The sequence of the overall processing will be described first with reference to FIG. 5.

Pieces of normal time-series data detected (sensed) by the sensing units 201 are converted into pieces of frequency data 208 by the frequency conversion unit 205 (step S501) and the pieces of frequency data 208 are stored in the storage unit 207. The model construction unit 211 generates a correlation model 213 for each combination of pieces of frequency data from among the pieces of frequency data 208a to 208n and calculates a correlation strength 214 for each correlation model 213 (step S503). At this time, when each sensing unit 201 has generated pieces of time-series data a plurality of times, the correlation strength average/maximum deviation calculation unit 217 may calculate the average of correlation strengths 214 equal in number to the plurality of times and a maximum deviation (corresponding to the error determination threshold 215).

Pieces of new time-series data to be observed, which are detected by the sensing units 201, are converted into pieces of frequency data 210 by the frequency conversion unit 205 (step S505) and the pieces of frequency data 210 are stored in the storage unit 209. The model construction unit 219 obtains a correlation model for each combination of pieces of frequency data from among the pieces of frequency data 210a to 210n and calculates a correlation strength for each correlation model (step S507). The error detection unit 221 performs error detection processing by a comparison between the correlation models 213 generated based on the pieces of frequency data 208 that are pieces of normal data and the correlation models generated based on the pieces of frequency data 210 that are pieces of observed data (step S509).

The processes in steps S501, S503, S507, and S509 will be described in detail below with reference to FIGS. 6 to 9.

(1.3.2 Data Conversion Processing)

Figure 6:
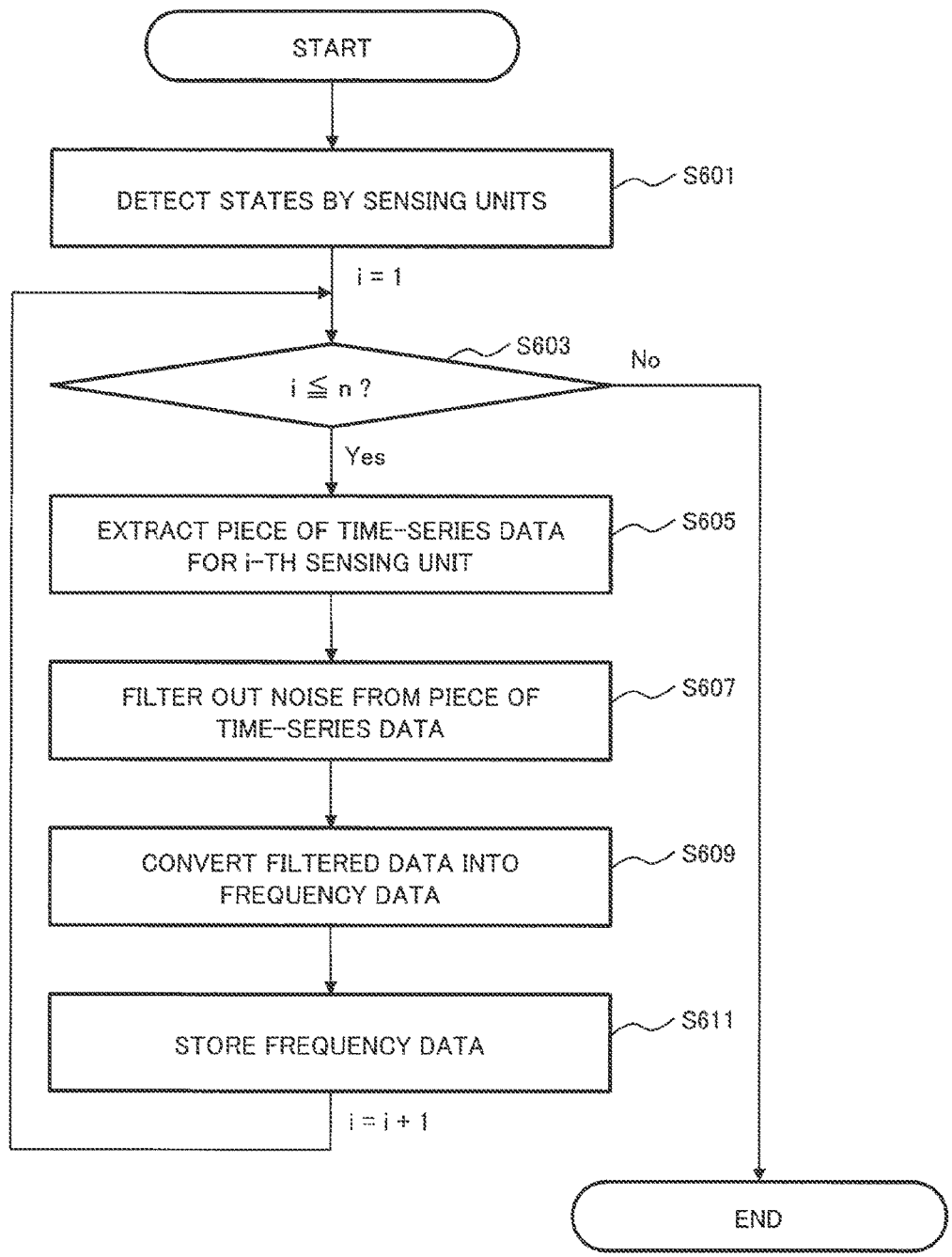
FIG. 6 is a flowchart illustrating the sequence of another processing by the information processing system illustrated in FIG. 3.

The sequence of processing for converting pieces of time-series data detected by the sensing units 201 will be described with reference to FIG. 6. A flowchart illustrated in FIG. 6 corresponds to the process in step S501 of FIG. 5.

In the normal state, the sensing units 201a to 201n detect states for an object to be measured, for a predetermined time (for example, for 10 seconds) (step S601). The noise filtering unit 203 and the frequency conversion unit 205 sequentially process pieces of time-series data 1 to n obtained from the sensing units 201a to 201n, respectively.

First, i=1 is set. If i is smaller than the number n of sensing units 201 (step S603), the noise filtering unit 203 extracts the i-th time-series data (the piece of data obtained from the i-th sensing unit 201) (step S605) and removes noise from the i-th time-series data (step S607). At this time, the noise filtering unit 203 may use a Butterworth filter for the pieces of time-series data to remove noise from them. If attention is focused on a frequency range around 1,000 Hz, the noise filtering unit 203 may use a Butterworth filter so that components having frequencies of 10 to 10,000 Hz remain.

The frequency conversion unit 205 converts the pieces of time-series data having their noise removed by the noise filtering unit 203 into pieces of frequency data 208 (step S609) and stores the pieces of frequency data 208 in the storage unit 207 (step S611). As a method for conversion into pieces of frequency data 208 by the frequency conversion unit 205, an AR (Auto-regressive) model (autocorrelation model), for example, may be used. In this case, the frequency conversion unit 205 may identify an autocorrelation model having a model order set by referring to AIC for the pieces of filtered time-series data, obtain an impulse response for the identified autocorrelation model, and convert the impulse response into frequencies.

The information processing system 100 repeats the processes in steps S603 to S611 until i>n holds (until no more data to be processed remains) while incrementing the value of i.

The above-mentioned processing is similarly performed in the generation (corresponding to the process in step S505 of FIG. 5) of pieces of frequency data 210 targeted for error detection (pieces of observed data).

(1.3.3 Model Construction Processing)

The sequence of processing for model construction will be described next with reference to FIGS. 7 and 8. A flowchart illustrated in FIG. 7 corresponds to the process in step S503 of FIG. 5.

Figure 7:
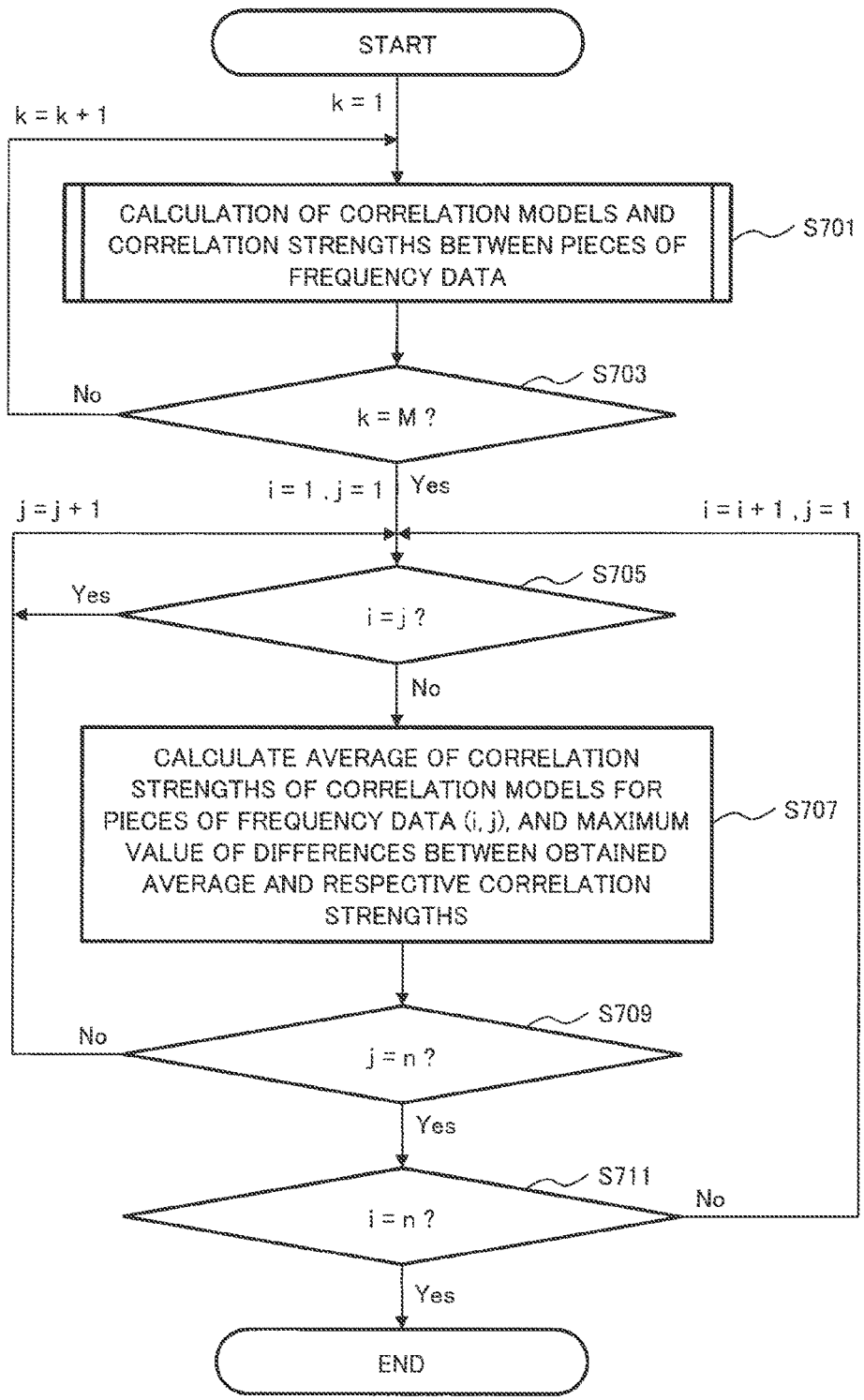
FIG. 7 is a flowchart illustrating the sequence of still another processing by the information processing system illustrated in FIG. 3.

FIG. 7 is a flowchart illustrating the sequence of processing for detecting a piece of time-series data, that is a piece of normal data, a plurality of times (in this case, M times) by each of the sensing units 201a to 201n and generating a correlation model 213 for a piece of frequency data 208 corresponding to each piece of time-series data.

The model construction unit 211 calculates a correlation model 213 for each combination of pieces of frequency data 208 with respect to the k-th detected normal data and further calculates a correlation strength 214 of each correlation model 213 (step S701). This processing will be described in more detail later with reference to FIG. 8.

After completion of calculation of a correlation model 213 and a correlation strength 214 for the M-th detected frequency data 208 that is a piece of normal data (Yes in step S703), M correlation models 213 and M correlation strengths 214 for the correlation models 213 are generated from M pieces of frequency data 208i and M pieces of frequency data 208j generated from pieces of time-series data obtained by M detections by the sensing units 201i and 201j, respectively (0<i, j≤n). The correlation strength average/maximum deviation calculation unit 217 obtains the average of the M correlation strengths 214 for each combination of (i, j) (steps S705 to S711). This calculates the average of correlation strengths for each combination of sensing units 201.

The process in step S701 will be described in detail next with reference to FIG. 8.

The model construction unit 211 sets i and j to 1 and extracts the pieces of frequency data 208i and 208j (the pieces of frequency data 208 generated from the pieces of time-series data detected by the i-th and j-th sensing units 201, respectively) from the storage unit 207 (steps S801 & S803). If i and j are equal to each other (Yes in step S805), the model construction unit 211 increments the value of j and extracts the frequency data 208j again (step S803).

If i and j are different from each other (No in step S805), the model construction unit 211 generates a correlation model 213 using the pieces of frequency data 208i and 208j (step S807). An ARX (Auto-regressive exogenous) model, for example, is used as the correlation model 213.

The model construction unit 211 calculates a predicted value for each frequency by applying the pieces of frequency data 208i and 208j used to generate the correlation model 213 to the generated correlation model 213. The model construction unit 211 further calculates a correlation strength 214 of the correlation model 213 based on the difference between the predicted value and an observed value (actual measured value) (step S809).

The model construction unit 211 stores the calculated correlation model 213 and correlation strength 214 in the storage unit 212 (step S811).

Note that the correlation model 213 used for error detection may be limited to only correlation models 213 having high prediction accuracy. In this case, only correlation strengths 214 having prediction accuracy greater than a threshold are used for error detection by the error detection unit 221.

The model construction unit 211 performs the above-mentioned processing for all combinations of the pieces of frequency data 208 while incrementing i and j until their values reach n.

Figure 8:
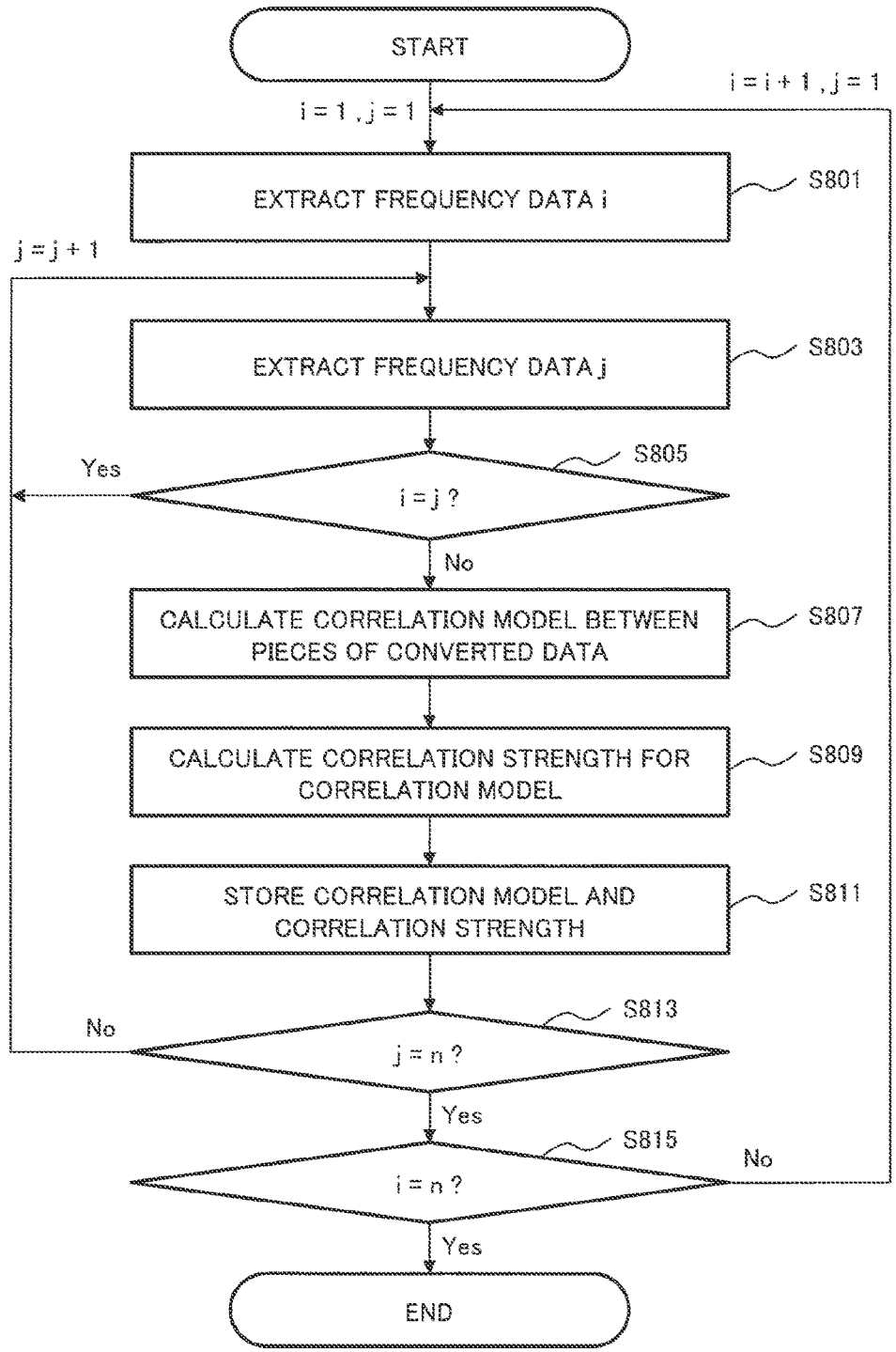
FIG. 8 is a flowchart illustrating the sequence of still another processing by the information processing system illustrated in FIG. 3.

Upon the processing illustrated in FIG. 8, correlation models 213 are generated for two combinations of pieces of frequency data: a combination of (frequency data 208i, frequency data 208j) and a combination of (frequency data 208j, frequency data 208i). The model construction unit 211 adopts a combination that generates a correlation model 213 with higher prediction accuracy (that generates a larger correlation strength 214) of these two combinations.

(1.3.4 Error Detection Processing)

Figure 9:
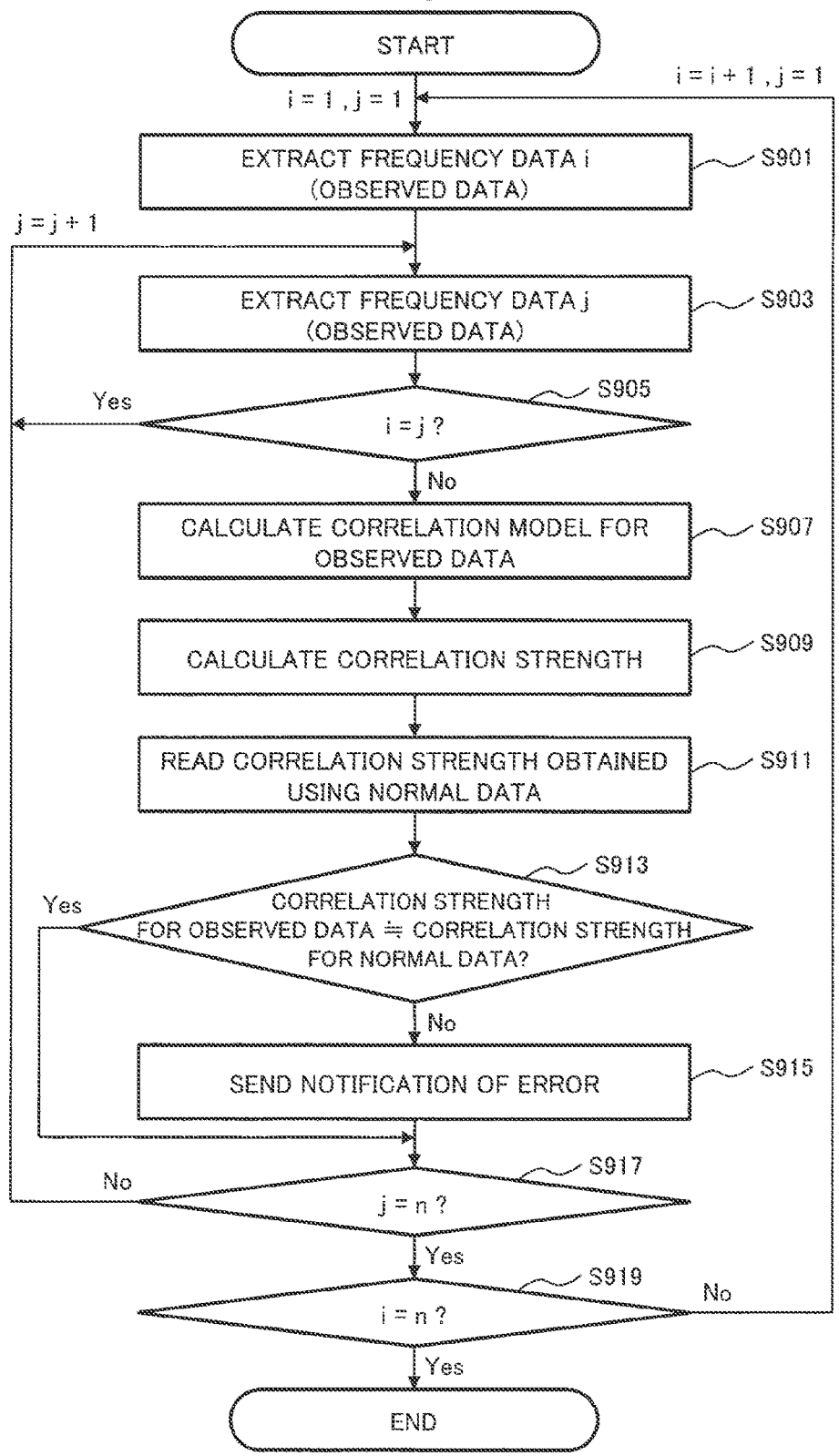
FIG. 9 is a flowchart illustrating the sequence of still another processing by the information processing system illustrated in FIG. 3.

The sequence of error detection processing will be described with reference to FIG. 9. A flowchart illustrated in FIG. 9 corresponds to the processes in steps S507 and S509 of FIG. 5.

The model construction unit 219 and the error detection unit 221 process the pieces of frequency data 210 targeted for error detection (pieces of observed data). First, the model construction unit 219 sets i and j to 1 and extracts the pieces of frequency data 210i and 210j (the pieces of frequency data 210 generated from the pieces of time-series data extracted by the i-th and j-th sensing units 201, respectively) from the storage unit 209 (steps S901 & S903). If i and j are equal to each other (Yes in step S905), the model construction unit 219 increments the value of j and extracts the frequency data 210j again (step S903).

If i and j are different from each other (No in step S905), the model construction unit 219 generates a correlation model using the pieces of frequency data 210i and 210j for the sensing units 201i and 201j (step S907). The model construction unit 219 calculates a correlation strength for the correlation model (step S909).

The error detection unit 221 receives the correlation strength of the correlation model for the sensing units 201i and 201j from the model construction unit 219. The error detection unit 221 reads, from the storage unit 212, the correlation strength 214 of the correlation model 213 generated based on the pieces of frequency data 208i and 208j (the pieces of frequency data 208 generated from the pieces of time-series data extracted by the i-th and j-th sensing units 201i and 201j, respectively) that are pieces of normal data (step S911). If the value of the correlation strength of the correlation model generated from the pieces of observed data is close to that of the correlation strength 214 of the correlation model 213 generated from the pieces of normal data (if, for example, their difference falls below the error determination threshold 215) (Yes in step S913), the error detection unit 221 can determine that the pieces of observed data are normal. On the other hand, if the difference between the correlation strength of the pieces of normal data and the correlation strength of the pieces of observed data is large (No in step S913), the error detection unit 221 can determine that the correlation between the sensing units 201$i$ and 201$j$ represented by the correlation model with respect to the correlation strengths has broken down (suffers an error). The notification unit 223 sends information indicating that an error has occurred, together with information or the like associated with the sensing units 201 having broken correlation (step S915). For example, at this time, the error detection unit 221 sends a notification that a sign of an error has appeared for frequencies to be processed, or other notifications.

The model construction unit 219 and the error detection unit 221 perform the above-mentioned processing for all combinations of the pieces of frequency data 210 while incrementing i and j until their values reach n.

After completion of processing for all combinations of the pieces of frequency data 210, the error detection unit 221 may list sensing units 201 included in large numbers in combinations expected to have broken correlation due to the occurrence of an error. This makes it possible to narrow down sensing units 201 likely to have an error.

The above description does not assume that correlation models 213 for the pieces of normal data are calculated a plurality of times. When a correlation model 213 and a correlation strength 214 for the correlation model 213 are calculated a plurality of times, the average of the correlation strengths and the correlation strength for a correlation model generated from the pieces of frequency data 210 that are pieces of observed data for the same combination of sensing units 201 are compared with each other.

(1.4 Hardware Configuration)

An exemplary hardware configuration for implementing the above-described signal conversion module 103, information processing apparatus 105, and information processing apparatus 107 by a computer 1000 will be described below with reference to FIG. 10. The functions of the signal conversion module 103, the information processing apparatus 105, and information processing apparatus 107 may be implemented as independent computers or by a single computer. These functions may also be implemented by four or more computers.

Figure 10:
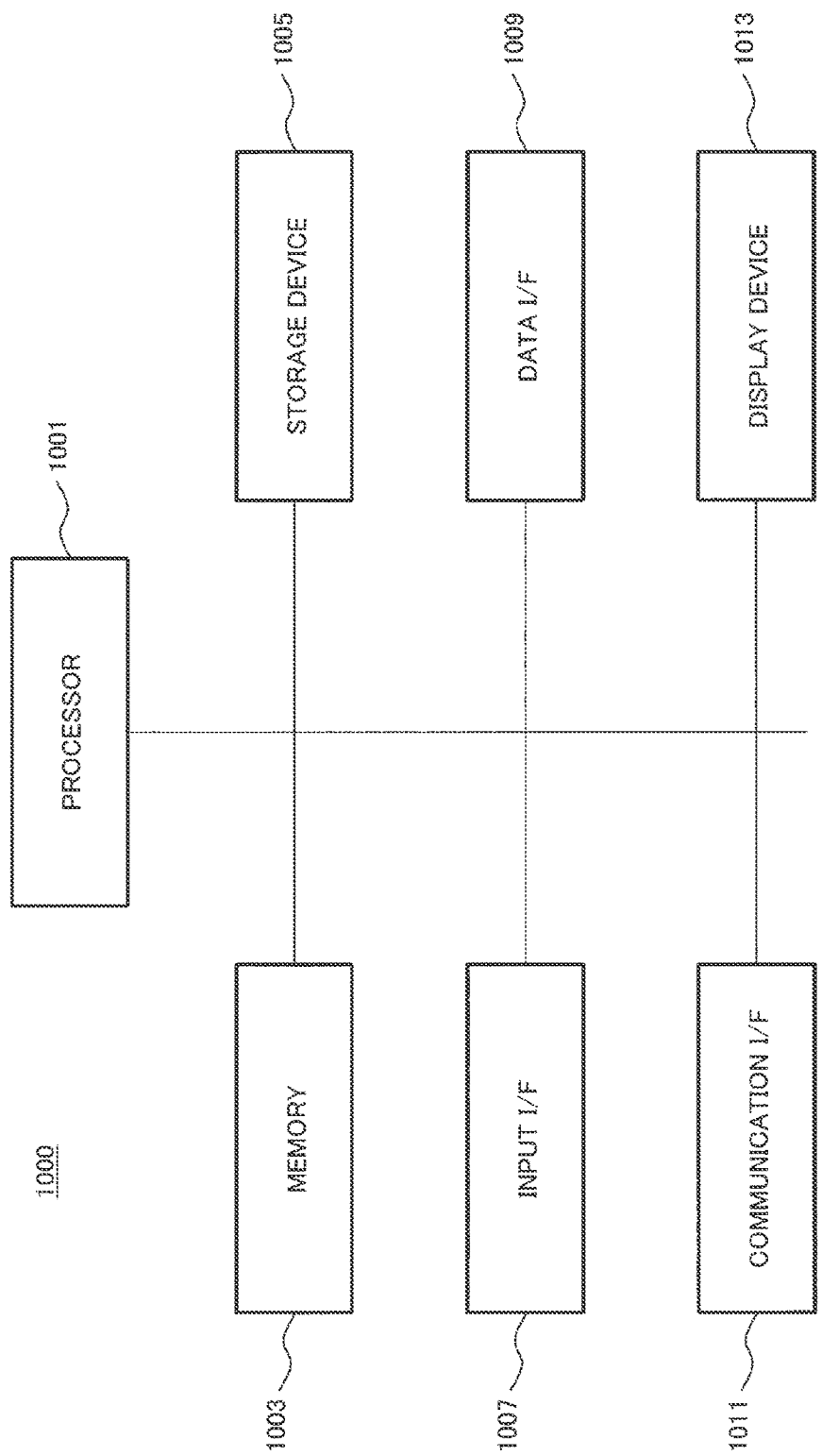
FIG. 10 is a block diagram illustrating the hardware configuration of a computer capable of implementing the information processing system illustrated in FIG. 3.

The computer 1000 includes a processor 1001, a memory 1003, a storage device 1005, an input interface (I/F) 1007, a data I/F 1009, a communication I/F 1011, and a display device 1013, as illustrated in FIG. 10.

The processor 1001 controls various types of processing in the computer 1000 by executing programs stored in the memory 1003. For example, the respective types of processing for the noise filtering unit 203, the frequency conversion unit 205, the model construction unit 211, the correlation strength average/maximum deviation calculation unit 217, the model construction unit 219, and the error detection unit 221, described with reference to FIG. 4, are temporarily stored in the memory 1003 and can be implemented as programs mainly running on the processor 1001.

The memory 1003 serves as a storage medium such as a RAM (Random Access Memory). The memory 1003 temporarily stores the program codes of programs executed by the processor 1001 and data required to execute the programs. For example, a stack area required to execute the programs is reserved in the storage area of the memory 1003.

The storage device 1005 serves as a nonvolatile storage medium such as a hard disk or a flash memory. The storage device 1005 stores various programs for implementing the operating system, the noise filtering unit 203, the frequency conversion unit 205, the model construction unit 211, the correlation strength average/maximum deviation calculation unit 217, the model construction unit 219, and the error detection unit 221. The storage device 1005 further stores various types of data and the like, including the pieces of frequency data 208 and 210, the correlation models 213, the correlation strengths 214, and the error determination thresholds 215. The programs and data stored in the storage device 1005 are loaded into the memory 1003 as appropriate, thereby being referred to from the processor 1001.

The input I/F 1007 serves as a device for accepting input from the user. A keyboard and a mouse or a touch panel, for example, is used as the input I/F 1007. The input I/F 1007 may be connected to the computer 1000 via an interface such as USB (Universal Serial Bus).

The data I/F 1009 serves as a device for receiving data from outside the computer 1000. A drive device for reading pieces of data stored in various storage media, for example, is used as the data I/F 1009. The data I/F 1009 may be located outside the computer 1000. In this case, the data I/F 1009 is connected to the computer 1000 via an interface such as USB.

The communication I/F 1011 serves as a device for wired or wireless data communication with devices external to the computer 1000, such as the sensing units 201. The communication I/F 1011 may be located outside the computer 1000. In this case, the communication I/F 1011 is connected to the computer 1000 via an interface such as USB.

The display device 1013 serves to display various types of information. The display 111 illustrated in FIG. 3 may serve as the display device 1013. A liquid crystal display or an organic EL (Electro-Luminescence) display, for example, is used as the display device 1013. The display device 1013 may be located outside the computer 1000. In this case, the display device 1013 is connected to the computer 1000 via a display cable or the like.

(1.5 Advantageous Effect according to Present Exemplary Embodiment)

As described above, the information processing system 100 according to the present exemplary embodiment models correlation between the sensing units 201 as a correlation model 213, using the pieces of frequency data 208, for pieces of time-series data which are detected by the sensing units 201 and show distinctive changes in frequency. In this manner, the information processing system 100 according to the present exemplary embodiment identifies correlation not as correlation coefficients but as correlation models 213 and can therefore determine the normal or error state for the pieces of sensor data on the basis of changes in correlation.

In other words, the information processing system 100 according to the present exemplary embodiment is capable of satisfactory data analysis.

(2 Second Exemplary Embodiment)

A second exemplary embodiment will be described below. In the following description, the same reference numerals denote configurations which are the same as or similar to those in the first exemplary embodiment, and a description thereof will be omitted where appropriate. When effects which are the same as or similar to those in the first exemplary embodiment are obtained, a description of some details will also be omitted.

In particular, since the configuration of an entire information processing system 100 according to the specific example illustrated in FIG. 2 and the configuration of a computer 1000 for implementing a signal conversion module 103, information processing apparatus 105, and information processing apparatus 107 are the same as in the first exemplary embodiment, a description thereof will not be given.

(2.1 Overview)

Figure 11:
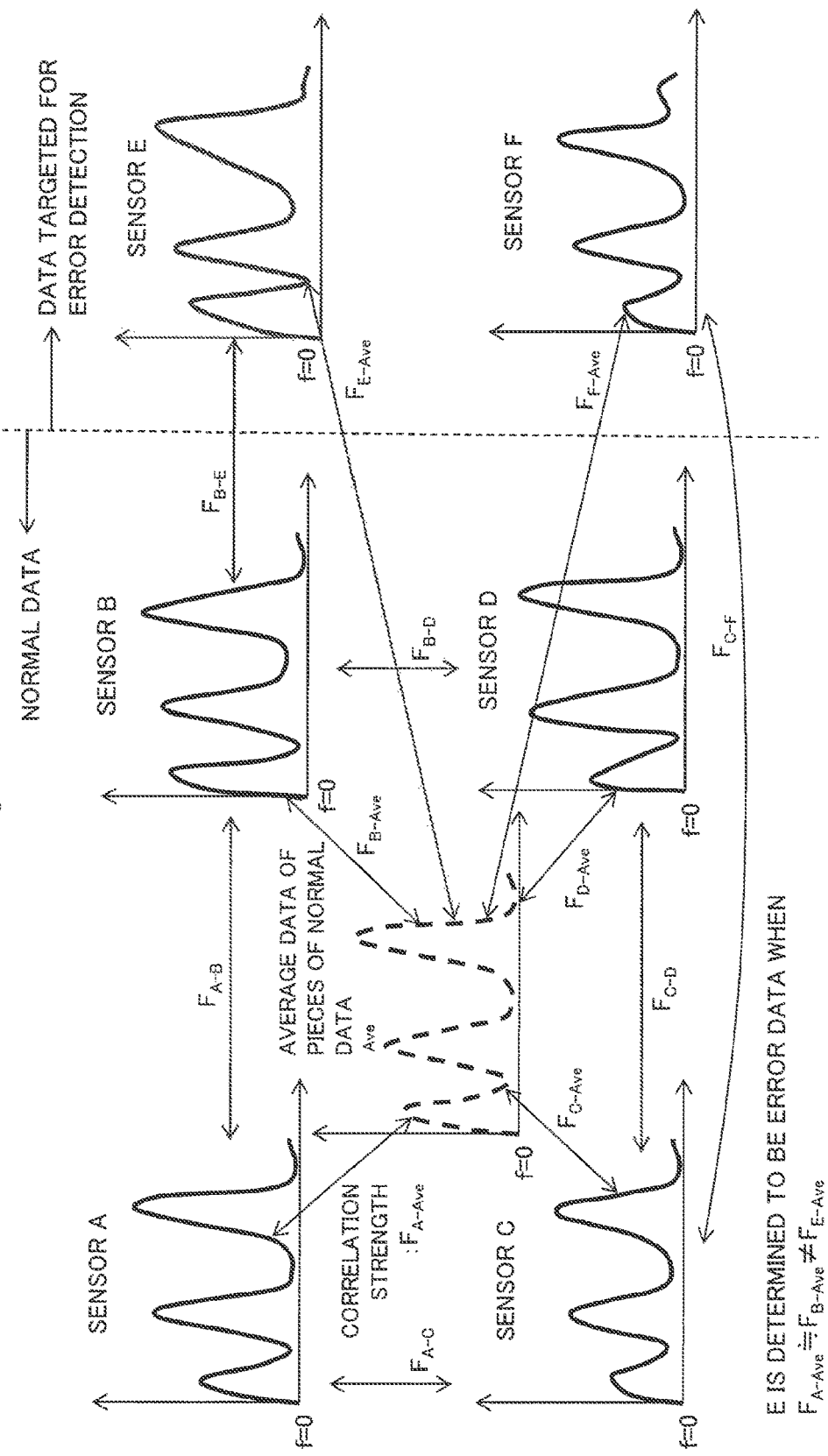
FIG. 11 is a diagram for explaining a specific example of an overview of processing by an information processing system according to a second exemplary embodiment.

An overview of processing by the information processing system 100 according to the present exemplary embodiment will be briefly described below with reference to FIG. 11.

In the first exemplary embodiment, correlation models are generated from the pieces of frequency data 208 and 210 for the respective sensing units 201. In the present exemplary embodiment, the average of pieces of frequency data 208 that are pieces of normal data detected by respective sensing units 201 is obtained, and a correlation model and a correlation strength are generated between the obtained average and each piece of frequency data 208. This processing will be described with reference to a specific example illustrated in FIG. 11. First, average frequency data indicated by a broken line shown at the left center is generated for pieces of frequency data 208 obtained from sensors A to D represented by graphs. Correlation models are generated between the average frequency data and the pieces of frequency data 208 obtained from the sensors A to D. Correlation strengths $F_{A\text{-}Ave}$ to $F_{D\text{-}Ave}$ are calculated for these correlation models.

In the first exemplary embodiment, sensing units 201 which obtain pieces of normal data are identical to sensing units 201 which obtain pieces of observed data (pieces of data targeted for error determination), and the pieces of normal data and the pieces of observed data are different from each other in terms of timing for obtaining pieces of time-series data. In the present exemplary embodiment, sensing units 201 for obtaining pieces of normal data are different from sensing units 201 for obtaining pieces of observed data. Taking FIG. 11 as an example, the pieces of normal data are pieces of frequency data obtained by converting pieces of time-series data obtained from the sensors A to D, and the pieces of observed data are pieces of frequency data obtained by converting pieces of time-series data obtained from sensors E and F. For the pieces of observed data as well, correlation models are generated with respect to the average frequency data of the pieces of normal data mentioned above, and their correlation strengths are calculated (correlation strengths $F_{E\text{-}Ave}$ and $F_{F\text{-}Ave}$ in FIG. 11).

When the correlation strengths $F_{A\text{-}Ave}$ to $F_{D\text{-}Ave}$ of the correlation models between the average frequency data and the pieces of frequency data for the pieces of normal data are nearly equal to each other (for example, their differences are equal to or smaller than a threshold) but the correlation strengths $F_{A\text{-}Ave}$ to $F_{D\text{-}Ave}$ are greatly different from the correlation strength $F_{E\text{-}Ave}$ or $F_{F\text{-}Ave}$ of the correlation model between the average frequency data for the pieces of normal data and the pieces of frequency data for the pieces of observed data (for example, their differences are greater than a threshold), the information processing system 100 determines that an error has occurred for the sensor E or F.

(2.2 Functional Configuration)

Figure 12:
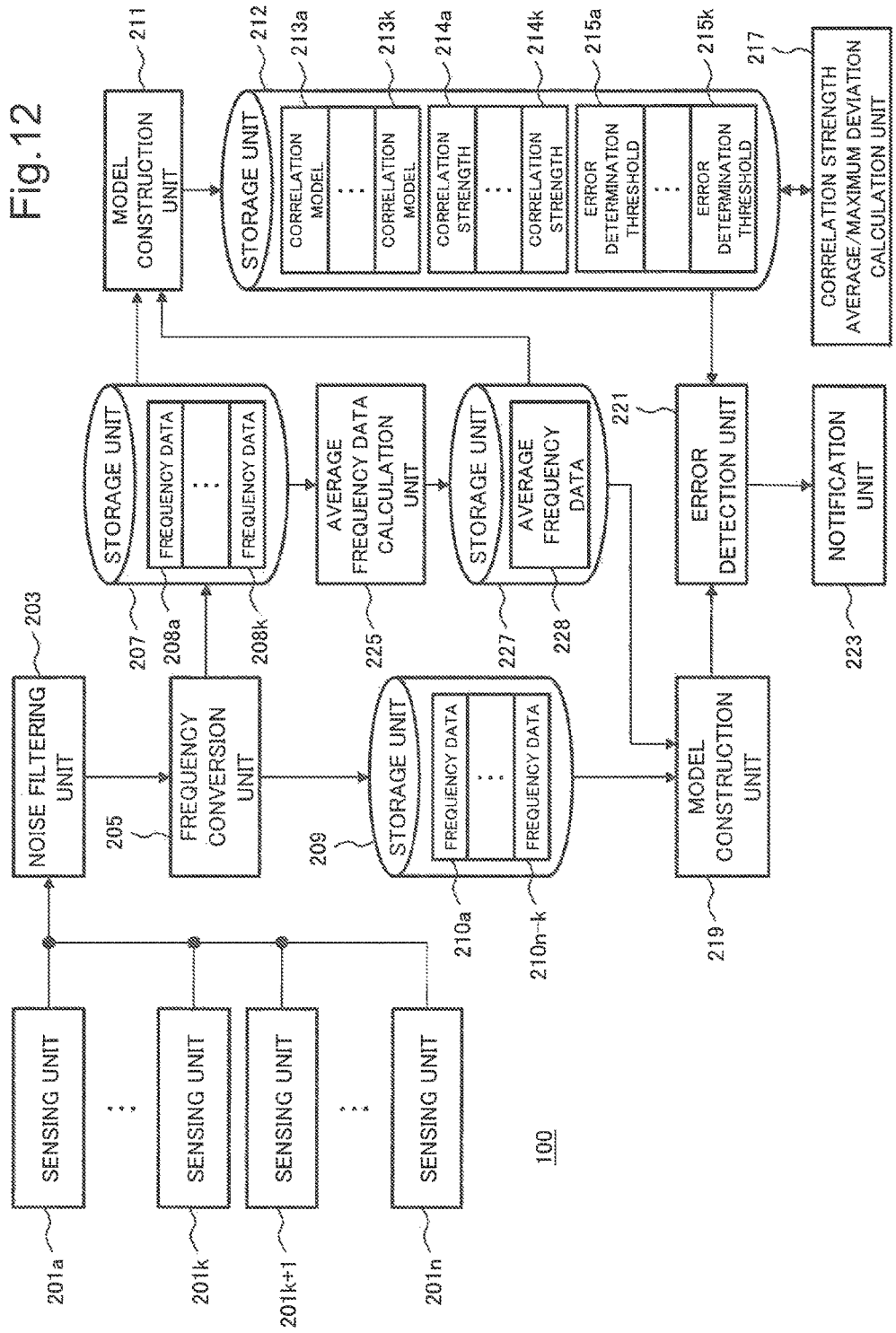
FIG. 12 is a block diagram illustrating a specific example of the functional configuration of the information processing system according to the second exemplary embodiment.

Since the system configuration is the same as in the first exemplary embodiment, a description thereof will not be given. The functional configuration of the information processing system 100 according to the present exemplary embodiment will be described below with reference to FIG. 12. The information processing system 100 according to the present exemplary embodiment further includes an average frequency data calculation unit 225 and a storage unit 227 which stores average frequency data 228 as well as the configuration of the information processing system 100 according to the first exemplary embodiment, as illustrated in FIG. 12.

The sensing units 201 detect vibration, light, or sounds and generate and output pieces of time-series data, as in the first exemplary embodiment. In the present exemplary embodiment, sensing units 201a to 201k detect pieces of normal data and sensing units 201k+1 to 201n detect pieces of observed data. In the present exemplary embodiment, the number of sensing units 201 for detecting pieces of normal data may be any number greater than one. Further, the number of sensing units 201 for detecting pieces of observed data may be any number greater than zero.

A noise filtering unit 203 removes noise from the pieces of time-series data output from the sensing units 201, as in the first exemplary embodiment. A frequency conversion unit 205 converts the pieces of time-series data that are respectively detected by the sensing units 201a to 201k and have their noise removed into pieces of frequency data 208a to 208k (to be also collectively referred to as pieces of frequency data 208 hereinafter), respectively, and outputs the pieces of frequency data 208 to a storage unit 207. The frequency conversion unit 205 further converts the pieces of time-series data that are respectively detected by the sensing units 201k+1 to 201n and have their noise removed into pieces of frequency data 210a to 201n-k (to be also collectively referred to as pieces of frequency data 210 hereinafter), respectively, and outputs the pieces of frequency data 210 to a storage unit 209. The pieces of frequency data 208 are pieces of normal data representing the normal state and the pieces of frequency data 210 are pieces of observed data targeted for error detection.

The average frequency data calculation unit 225 calculates the average of the pieces of frequency data 208a to 208k for each frequency to generate average frequency data 228 that is the average data of pieces of normal data. The calculated average frequency data 228 is stored in the storage unit 227.

A model construction unit 211 generates correlation models 213a to 213k (to be also collectively referred to as correlation models 213 hereinafter) between the average frequency data 228 and each of the pieces of frequency data 208a to 208k that are pieces of normal data. The generated correlation models 213 are stored in a storage unit 212. The model construction unit 211 calculates correlation strengths 214a to 214k of the correlation models 213a to 213k, respectively, and stores these correlation strengths in the storage unit 212 together.

When a piece of frequency data 208 has been observed a plurality of times for each sensing unit 201, the model construction unit 211 can generate correlation models 213 and correlation strengths 214 equal in number to the plurality of times, for a combination of each sensing unit 201 and the average frequency data 228. A correlation strength average/maximum deviation calculation unit 217 obtains the average of the plurality of generated correlation strengths 214 to calculate a maximum deviation. The maximum deviation corresponds to the maximum value of the differences between the average of the correlation strengths 214 and each of the correlation strengths 214 used to calculate this average for the respective correlation models 213. The maximum deviation may be stored in the storage unit 212 as an error determination threshold 215 used for error determination.

The correlation strength average/maximum deviation calculation unit 217 is unnecessary when each sensing unit 201 performs observation only once.

A model construction unit 219 generates correlation models between the average frequency data 228 and each of the pieces of frequency data 210a to 210n-k that are pieces of observed data and calculates the correlation strength of each correlation model.

An error detection unit 221 detects an error by comparing the correlation strengths 214 of the correlation models 213 generated based on the pieces of frequency data 208 that are pieces of normal data with the correlation strengths of the correlation models generated based on the pieces of the frequency data 210 that are pieces of observed data. When, for example, the correlation strengths 214 of the correlation models 213 generated based on the pieces of frequency data 208 are close to each other (for example, fall within a threshold range) but the correlation strength of the correlation model generated based on the piece of frequency data 210 falls outside a range defining a close correlation (for example, falls outside a threshold range), the error detection unit 221 determines that the correlation has broken down (an error has occurred).

A notification unit 223 notifies the user of an error detection result obtained by the error detection unit 221. As a method for notification by the notification unit 223, the notification unit 223 may, for example, display a message on a display 111.

(2.3 Sequence of Processing)

The sequence of processing by the information processing system 100 according to the present exemplary embodiment will be described below.

(2.3.1 Sequence of Overall Processing)

The sequence of the overall processing will be described first with reference to FIG. 5.

Pieces of normal time-series data detected (sensed) by the sensing units 201 are converted into pieces of frequency data 208 by the frequency conversion unit 205 (step S1301) and the pieces of frequency data 208 are stored in the storage unit 207. The average frequency data calculation unit 225 obtains the average of the pieces of frequency data 208 stored in the storage unit 207 for each frequency to generate average frequency data 228 (step S1303). The model construction unit 211 generates a correlation model 213 between each piece of frequency data 208 and the average frequency data 228 and calculates a correlation strength 214 for each correlation model 213 (step S1305). At this time, when a piece of frequency data 208 has been generated a plurality of times from the pieces of time-series data detected by each sensing unit 201 a plurality of times, the correlation strength average/maximum deviation calculation unit 217 may calculate the average of correlation strengths 214 equal in number to the plurality of times and a maximum deviation (corresponding to the error determination threshold 215).

Pieces of time-series data to be observed, which are detected by the sensing units 201k+1 to 201n, are converted into pieces of frequency data 210 by the frequency conversion unit 205 (step S1307) and the pieces of frequency data 210 are stored in the storage unit 209. The model construction unit 219 obtains a correlation model between the average frequency data 228 and each of the pieces of frequency data 210a to 219n-k and calculates the correlation strength of each correlation model (step S1309). The error detection unit 221 performs error detection processing by a comparison between the correlation models 213 generated based on the pieces of frequency data 208 that are pieces of normal data and the correlation models generated based on the pieces of frequency data 210 that are pieces of observed data (step S1311).

The processes in steps S1301 and S1307 are the same as in steps S501 and S505, respectively, described with reference to FIG. 5 in the first exemplary embodiment. The processes in steps S1305, S1309, and S1311 will be described below with reference to FIG. 14.

(2.3.2 Generation of Correlation Models)

Figure 13:
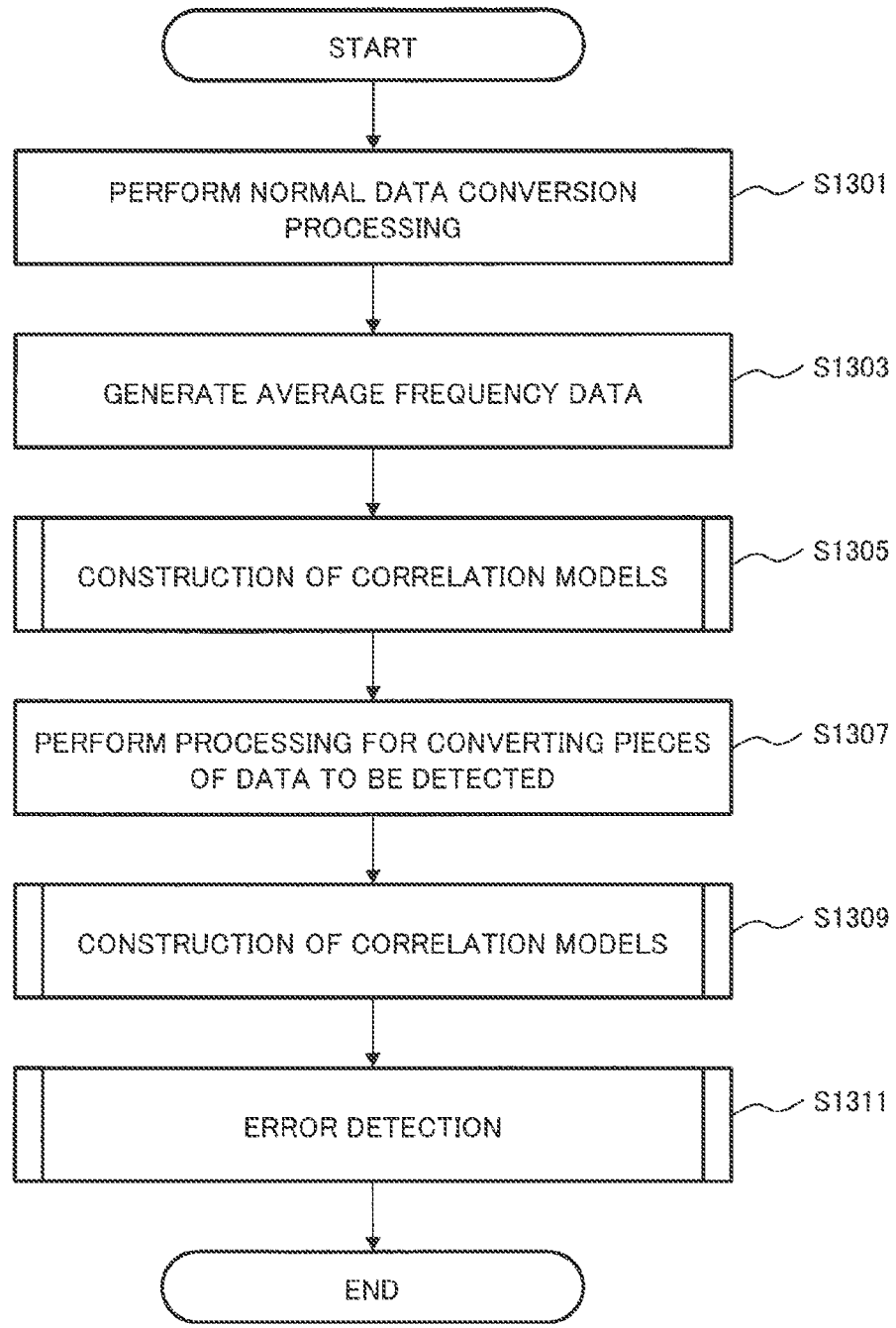
FIG. 13 is a flowchart illustrating the sequence of processing by the information processing system illustrated in FIG. 12.

The sequence of processing for model construction will be described with reference to FIGS. 14 and 15. A flowchart illustrated in FIG. 14 corresponds to step S1305 in FIG. 13.

Figure 14:
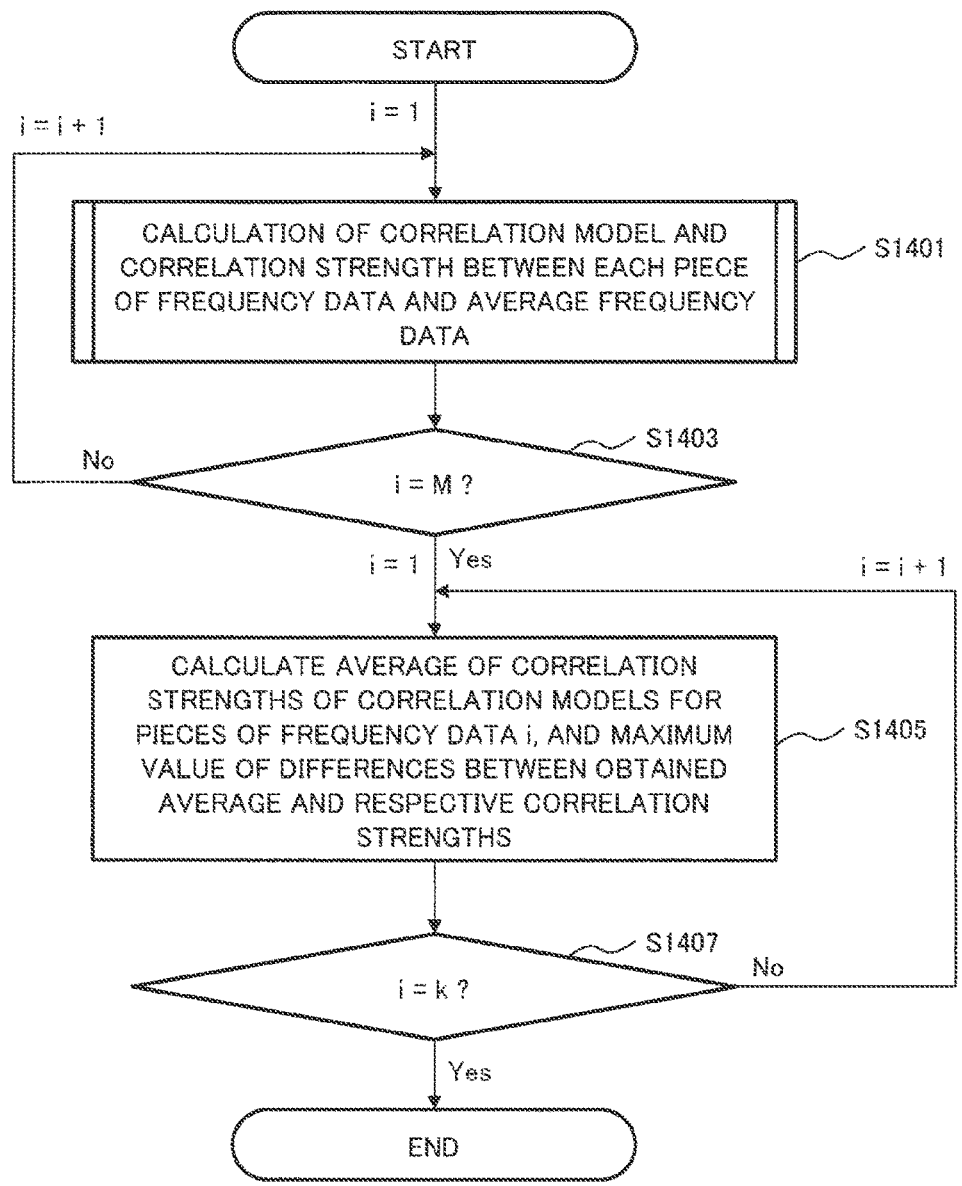
FIG. 14 is a flowchart illustrating the sequence of another processing by the information processing system illustrated in FIG. 12.
Figure 15:
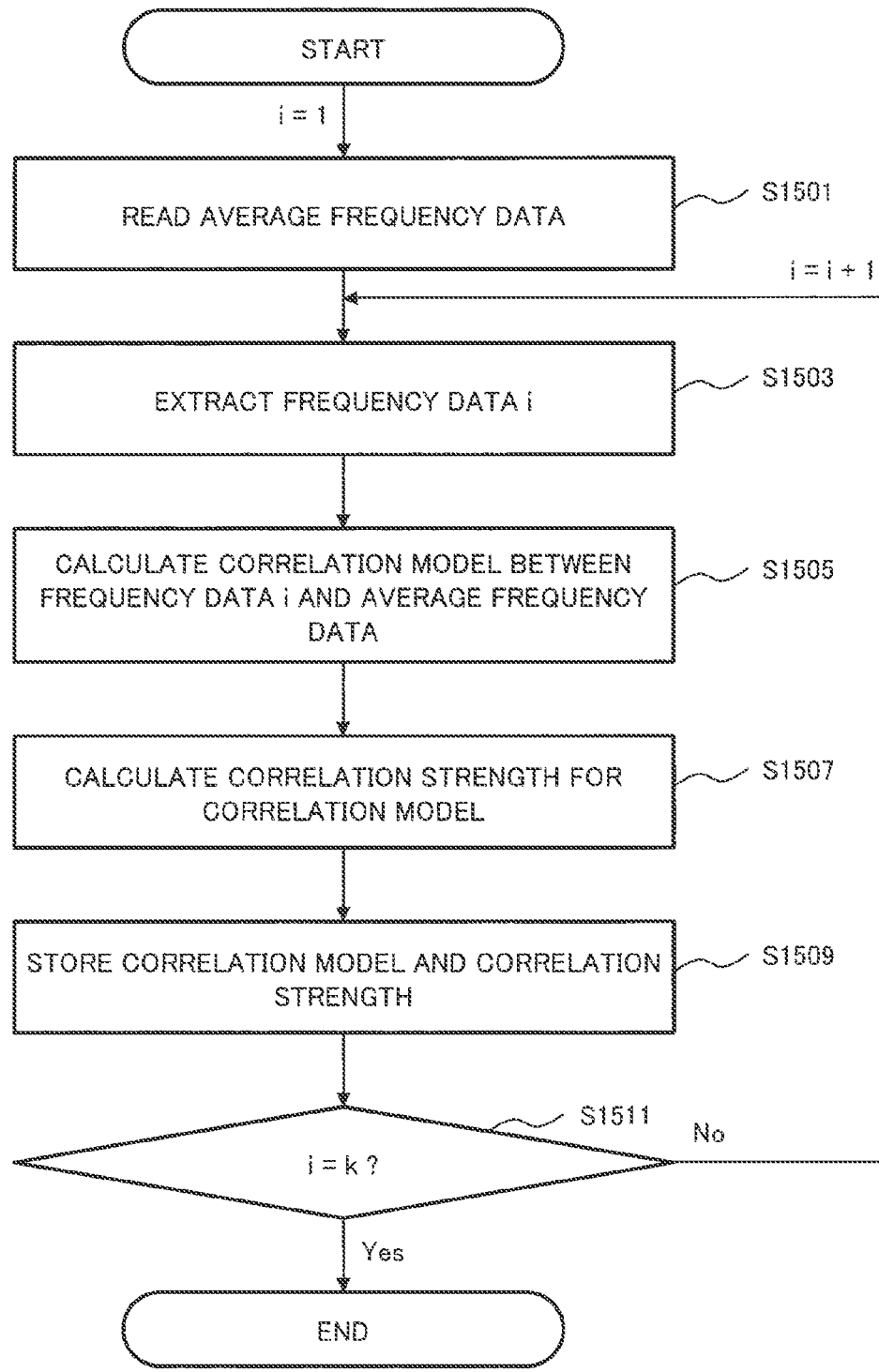
FIG. 15 is a flowchart illustrating the sequence of still another processing by the information processing system illustrated in FIG. 12.

FIG. 14 is a flowchart illustrating the sequence of processing for detecting pieces of time-series data that are pieces of normal data a plurality of times (in this case, M times) by each of the sensing units 201a to 201k and generating a correlation model 213 for a piece of frequency data 208 corresponding to each piece of time-series data.

The model construction unit 211 generates a correlation model 213, as described with reference to Expression 1, for the i-th detected normal data with respect to the average frequency data 228. The model construction unit 211 calculates a predicted value for the strength at each frequency, using the generated correlation model 213 and the piece of frequency data used for model generation. The model construction unit 211 obtains the difference between the predicted value and an actual measured value and stores this difference as an error determination threshold 215 used for error detection. The model construction unit 211 further calculates a correlation strength 214 of the correlation model 213 on the basis of Expression 2 (step S1401). This processing will be described in more detail later with reference to FIG. 15.

After completion of calculation of a correlation model 213 and a correlation strength 214 for the M-th detected frequency data 208 that is a piece of normal data (Yes in step S1403), the correlation strength average/maximum deviation calculation unit 217 obtains the average of correlation strengths 214 for M generated correlation models 213 between each sensing unit 201i and the average frequency data 228 (step S1405). The correlation strength average/maximum deviation calculation unit 217 calculates the maximum value of the differences between the average and each of the M correlation strengths 214. This maximum value can be used as an error determination threshold 215 used for error detection. The error determination threshold 215 may be stored in the storage unit 212.

The process in step S1401 will be described in more detail next with reference to FIG. 15.

The model construction unit 211 reads the average frequency data 228 first (step S1501). The model construction unit 211 sets i to 1 and extracts the frequency data 208i (the piece of frequency data 208 generated from the piece of time-series data extracted from the i-th sensing unit 201) from the storage unit 207 (step S1503).

The model construction unit 211 generates a correlation model 213 using the frequency data 208i and the average frequency data 228 (step S1505). An ARX model, for example, is used as the correlation model 213.

The model construction unit 211 calculates a predicted value for a piece of frequency data at each frequency by applying the piece of frequency data 208 used for model generation to the generated correlation model 213. The model construction unit 211 further calculates a correlation strength for the correlation model 213 based on the difference between the predicted value and an actual measured value (observed value) of the piece of frequency data 208 (step S1507). The model construction unit 211 stores the calculated correlation model 213 and correlation strength 214 in the storage unit 212 (step S1509).

Note that the correlation model 213 used for error detection may be limited to only correlation models 213 having high prediction accuracy. In this case, only correlation strengths 214 having prediction accuracy greater than a threshold are used for error detection by the error detection unit 221.

The model construction unit 211 performs the above-mentioned processing for all pieces of frequency data 208 while incrementing i until its value reaches k that is the number of sensing units 201 for detecting pieces of observed data.

Upon the processing, correlation models 214 can be generated for two combinations of pieces of data: a combination of the piece of frequency data 208 and the average frequency data 228, and a combination of the average frequency data 228 and the piece of frequency data 208. The model construction unit 211 may adopt a combination having a higher correlation strength 214 of these two combinations. The same applies to the correlation strengths of the correlation models between each of the pieces of frequency data 210 and the average frequency data 228 (to be described later).

(2.3.3 Error Detection Processing)

Figure 16:
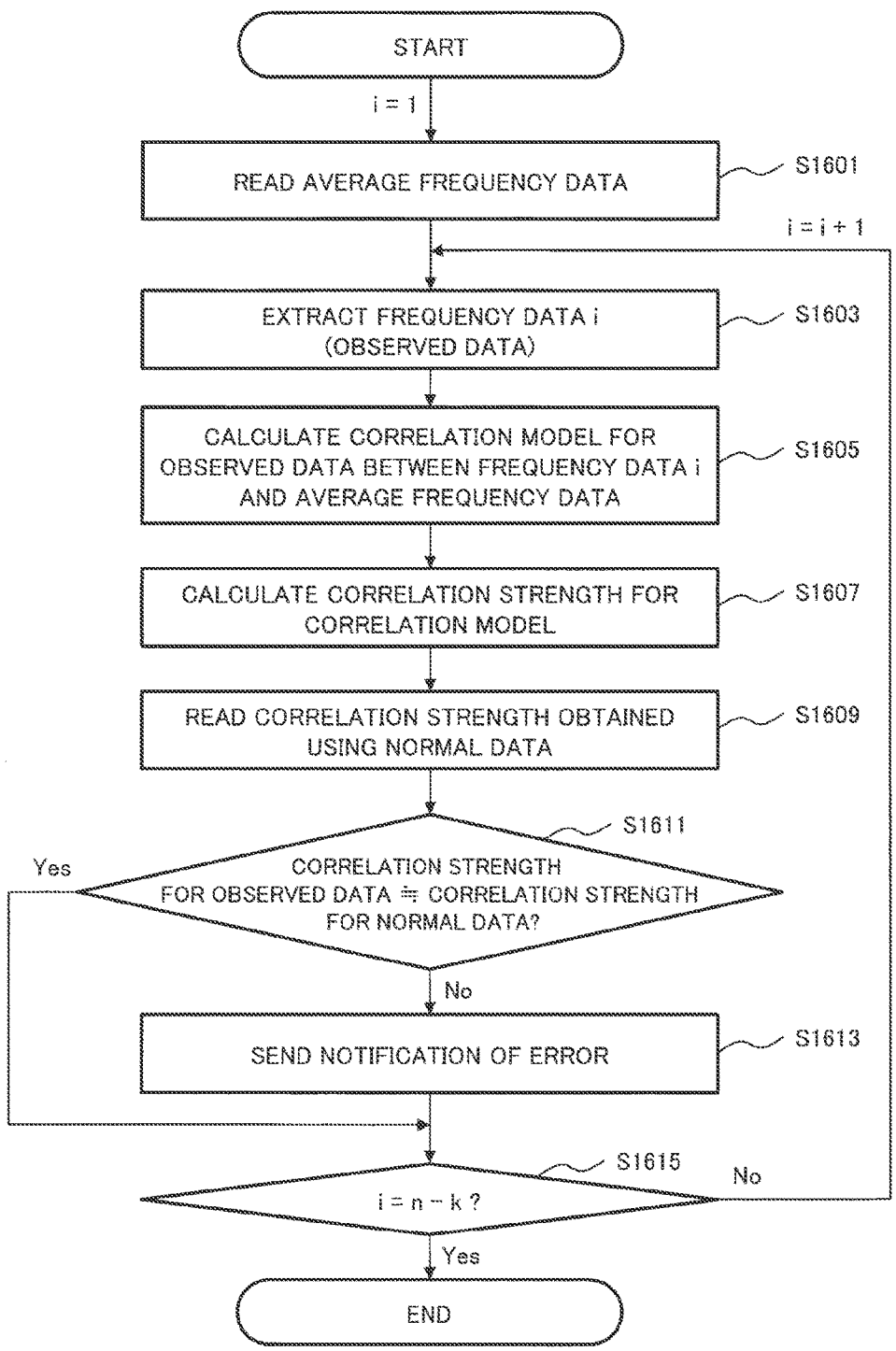
FIG. 16 is a flowchart illustrating the sequence of still another processing by the information processing system illustrated in FIG. 12.

The sequence of error detection processing will be described with reference to FIG. 16. A flowchart illustrated in FIG. 16 corresponds to the processes in steps S1309 and S1311 of FIG. 13.

The model construction unit 219 processes the pieces of frequency data 210 targeted for error detection (pieces of observed data). First, the model construction unit 219 reads the average frequency data 228 (step S1601), sets i to 1, and extracts the frequency data 210i (the piece of frequency data 210 generated from the piece of time-series data extracted from the (k+i)-th sensing unit 201) from the storage unit 209 (step S1603).

The model construction unit 211 generates a correlation model 213 using the frequency data 210i and the average frequency data 228 (step S1605). An ARX model, for example, is used as the correlation model. The model construction unit 211 calculates a correlation strength for the generated correlation model (step S1607).

The error detection unit 221 receives the correlation strength of the correlation model for the sensing unit 201i from the model construction unit 219. The error detection unit 221 reads, from the storage unit 212, the correlation strength 214 of each correlation model 213 generated from the piece of frequency data 208 that is a piece of normal data (step S1609). If each correlation strength 214 for the piece of normal data and the average of the correlation strengths 214 are close to each other (for example, fall within a threshold range) and the correlation strength of the correlation model for the frequency data 210i and the average of the correlation strengths 214 are close to each other (for example, fall within a threshold range) (Yes in step S1611), the error detection unit 221 can determine that the piece of observed data is normal. On the other hand, if each correlation strength 214 for the piece of normal data and the average of the correlation strengths 214 are close to each other (for example, fall within a threshold range) but the correlation strength of the correlation model for the frequency data 210i and the average of the correlation strengths 214 are different from each other (for example, fall outside a threshold range) (No in step S1611), the error detection unit 221 can determine that the sensing unit 201i represented by the correlation model for the correlation strength has an abnormal value. The notification unit 223 sends information indicating that an error has occurred, together with information associated with the sensing units 201i having broken correlation (step S1613). For example, at this time, the error detection unit 221 sends a notification that a sign of an error has appeared for frequencies to be processed, or other notifications.

The criterion for error determination is not limited to this. For example, this criterion may be defined as the relationship between the absolute value of the difference between the correlation strength of a correlation model generated from a piece of frequency data 210 to be determined and the average of correlation strengths 214 of correlation models 213 generated from pieces of frequency data 208 that are pieces of normal data, and the absolute value of the maximum value of the differences between the average of the correlation strengths 214 of the correlation models 213 generated based on the pieces of frequency data 208 that are pieces of normal data and the correlation strengths 214 of the respective correlation models 213.

The model construction unit 219 and the error detection unit 221 process all pieces of frequency data 210 while incrementing i until its value reaches n.

After completion of processing for all pieces of frequency data 210, the error detection unit 221 may list sensing units 201 suffering an error. This makes it possible to narrow down sensing units 201 likely to have an error.

The above description does not assume that correlation models 213 for the pieces of normal data are calculated a plurality of times. When a correlation model 213 and a correlation strength 214 for the correlation model 213 are calculated a plurality of times, the average of the correlation strengths and the correlation strength for a correlation model generated from the pieces of frequency data 210 that are pieces of observed data for the same combination of sensing units 201 are compared with each other.

(2.4 Advantageous Effect according to Present Exemplary Embodiment)

As described above, the information processing system 100 according to the present exemplary embodiment uses the model construction units 211 and 219 to model correlation between each of the sensing units 201 and the average frequency data 228, using the pieces of frequency data 208, for pieces of time-series data which are detected by the sensing units 201 and show distinctive changes in frequency. In this manner, the information processing system 100 according to the present exemplary embodiment identifies correlation not as correlation coefficients but as correlation models and can therefore determine the normal or error state for the pieces of sensor data on the basis of changes in correlation.

In other words, the information processing system 100 according to the present exemplary embodiment is capable of satisfactory data analysis.

(3 Third Exemplary Embodiment)

A third exemplary embodiment will be described below. In the following description, the same reference numerals denote configurations which are the same as or similar to those in the first or second exemplary embodiment, and a description thereof will be omitted where appropriate. When effects which are the same as or similar to those in the first or second exemplary embodiment are obtained, a description of some details will also be omitted.

In particular, since the configuration of an entire information processing system 100 according to the specific example illustrated in FIG. 2 and the configuration of a computer 1000 for implementing a signal conversion module 103, information processing apparatus 105, and information processing apparatus 107 are the same as in the first exemplary embodiment, a description thereof will not be given.

(3.1 Overview)

An overview of processing by the information processing system 100 according to the present exemplary embodiment will be briefly described below with reference to FIG. 17.

In the second exemplary embodiment, pieces of normal data are generated from the pieces of time-series data obtained from the sensing units 201a to 201k, and pieces of observed data are generated from the pieces of time-series data obtained from the sensing units 201k+1 to 201n. In the present exemplary embodiment, pieces of normal data and pieces of observed data are obtained from the same sensing units 201a to 201n at different timings, as in the first exemplary embodiment.

In the present exemplary embodiment, as in the second exemplary embodiment, the average of pieces of frequency data 208 that are pieces of normal data for respective sensing units 201 is obtained, and a correlation model and a correlation strength are calculated between the obtained average and each piece of frequency data 208. This processing will be described with reference to FIG. 17. First, average frequency data 228 indicated by a broken line shown at the left center is generated for pieces of frequency data obtained from sensors A to D represented by graphs. Correlation models 214 are generated between the average frequency data 228 and the pieces of frequency data 208 obtained from the sensors A to D. Correlation strengths $F_{A-Ave}$ to $F_{D-Ave}$ are calculated for these correlation models.

Figure 17:
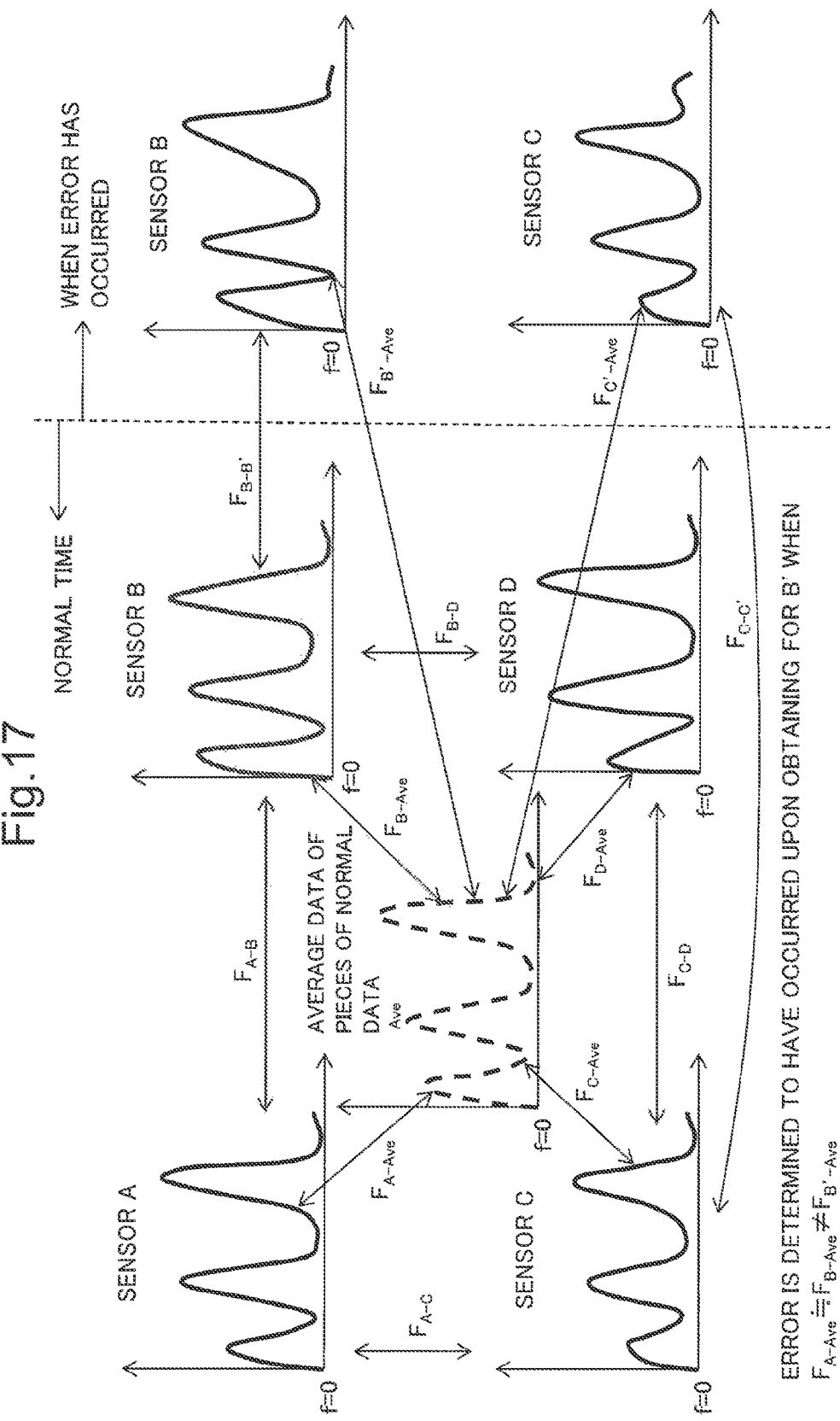
FIG. 17 is a diagram for explaining a specific example of an overview of processing by an information processing system according to a third exemplary embodiment.

Correlation models 214 are further generated between the average frequency data 228 and pieces of frequency data, shown on the right of FIG. 17, generated based on pieces of time-series data detected by the sensors B and C at timings different from those at which pieces of time-series data used to generate the pieces of frequency data are detected. Correlation strengths $F_{B'-Ave}$ and $F_{C'-Ave}$ are calculated for these correlation models.

When the correlation strengths $F_{A-Ave}$ to $F_{D-Ave}$ of the correlation models between the average frequency data and each of the pieces of frequency data for the pieces of normal data are nearly equal to each other (for example, their differences are equal to or smaller than a threshold) but are greatly different from the correlation strength $F_{B'-Ave}$ or $F_{C'-Ave}$ of the correlation model between the average frequency data 228 of the pieces of normal data and the piece of frequency data for the piece of observed data (for example, their differences are greater than a threshold), the information processing system 100 determines that an error has occurred for the sensor B or C.

(3.2 Functional Configuration)

Figure 18:
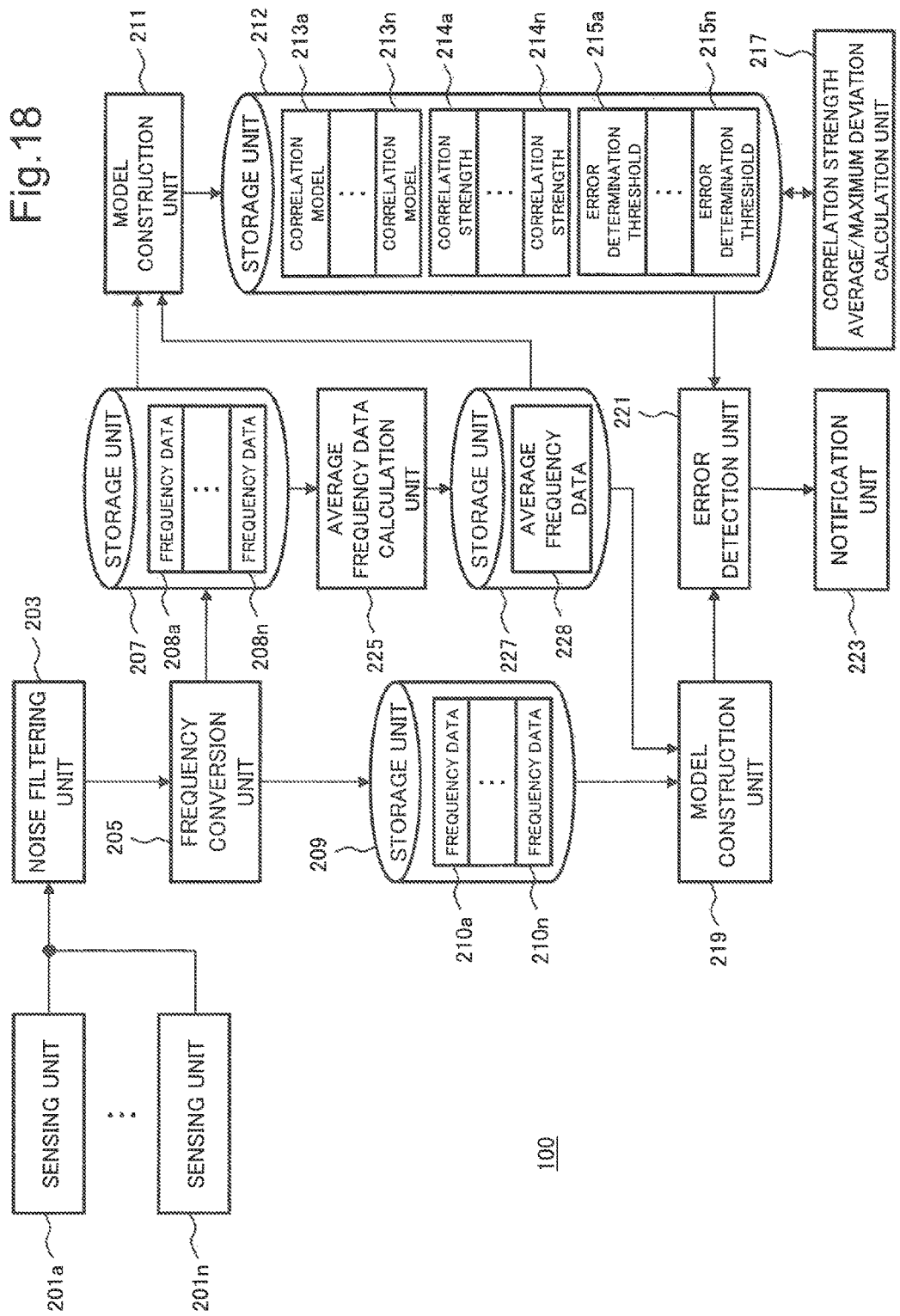
FIG. 18 is a block diagram illustrating a specific example of the functional configuration of the information processing system according to the third exemplary embodiment.

Since the system configuration is the same as in the first and second exemplary embodiments, a description thereof will not be given. FIG. 18 illustrates the functional configuration of the information processing system 100. As illustrated in FIG. 18, the functional configuration of the information processing system 100 according to the present exemplary embodiment is basically the same as in the second exemplary embodiment. However, as described earlier, the present exemplary embodiment is different from the second exemplary embodiment in that in the former, pieces of frequency data 208 that are pieces of normal data and pieces of frequency data 210 that are pieces of observed data are obtained from the same sensing units 201.

The sensing units 201 detect vibration, light, or sounds and generate and output pieces of time-series data, as in the first and second exemplary embodiments. In the present exemplary embodiment, the sensing units 201 detect pieces of data at least at two timings: in the normal state and the state for which it is unclear whether the state is normal or not (error detection target). In the present exemplary embodiment, the number of sensing units 201 may be any number greater than one.

A noise filtering unit 203 removes noise from the pieces of time-series data output from the sensing units 201, as in the first exemplary embodiment. A frequency conversion unit 205 converts the pieces of time-series data that are respectively detected by the sensing units 201 and have their noise removed into pieces of frequency data 208 and 210. The pieces of frequency data 208 and 210 are, for example, pieces of data detected at different timings. The pieces of frequency data 208 are pieces of normal data obtained by conversion from pieces of time-series data in the normal state. The pieces of frequency data 210 are pieces of observed data (pieces of data targeted for error detection) obtained by conversion from pieces of time-series data in the state for which it is unclear whether the state is normal or not. The pieces of frequency data 208 and 210 are stored in storage units 207 and 209, respectively.

An average frequency data calculation unit 225 calculates the average of the pieces of frequency data 208 for each frequency to generate average frequency data 228 as the average data of pieces of normal data. The generated average frequency data 228 is stored in a storage unit 227.

A model construction unit 211 generates correlation models 213a to 213n between the average frequency data 228 and respective pieces of frequency data 208a to 208n that are pieces of normal data. The generated correlation models 213 are stored in a storage unit 212. The model construction unit 211 calculates correlation strengths 214a to 214n of the respective correlation models 213 and stores these correlation strengths in the storage unit 212 together.

When a piece of frequency data 208 has been observed a plurality of times for each sensing unit 201, the model construction unit 211 can generate correlation models 213 and correlation strengths 214 equal in number to the plurality of times, for a combination of each sensing unit 201 and the average frequency data 228. A correlation strength average/maximum deviation calculation unit 217 obtains the average of the plurality of generated correlation strengths 214 to calculate a maximum deviation. The maximum deviation corresponds to the maximum value of the differences between the average of the correlation strengths 214 and each of the correlation strengths used to calculate this average for the respective correlation models 213. The maximum deviation may be stored in the storage unit 212 as an error determination threshold 215 used for error determination.

The correlation strength average/maximum deviation calculation unit 217 is unnecessary when each sensing unit 201 performs observation only once.

A model construction unit 219 generates correlation models between the average frequency data 228 and each of the pieces of frequency data 210 to 210n that are pieces of observed data and calculates the correlation strength of each correlation model.

An error detection unit 221 detects an error by comparing the correlation strengths 214 of the correlation models 213 generated based on the pieces of frequency data 208 that are pieces of normal data with the correlation strengths of the correlation models generated based on the pieces of the frequency data 210 that are pieces of observed data. When, for example, the correlation strengths 214 of the correlation models 213 generated based on the pieces of frequency data 208 are close to each other but the correlation strength of the correlation model generated based on the piece of frequency data 210 falls outside a range defining a close correlation, the error detection unit 221 determines that an error has occurred in the sensing unit 201 for this correlation model.

A notification unit 223 notifies the user of an error detection result obtained by the error detection unit 221. As a method for notification by the notification unit 223, the notification unit 223 may, for example, display a message on a display 111.

(3.3 Sequence of Processing)

The information processing system 100 according to the present exemplary embodiment is different from the second exemplary embodiment in that in the former, pieces of frequency data 208 and 210 to be processed by the model construction units 211 and 219 are obtained from the same sensing units 201 at different timings, as described above. Since other features are nearly the same as in the second exemplary embodiment, a description thereof will not be given herein.

(3.4 Advantageous Effect according to Present Exemplary Embodiment)

As described above, the information processing system 100 according to the present exemplary embodiment uses the model construction units 211 and 219 to model correlation between each of the sensing units 201 and the average frequency data 228, using the pieces of frequency data 208, for pieces of time-series data which are detected by the sensing units 201 and show distinctive changes in frequency. In this manner, the information processing system 100 according to the present exemplary embodiment identifies correlation not as correlation coefficients but as correlation models and can therefore determine the normal or error state for the pieces of sensor data on the basis of changes in correlation.

In other words, the information processing system 100 according to the present exemplary embodiment is capable of satisfactory data analysis.

(4 Fourth Exemplary Embodiment)

A fourth exemplary embodiment will be described below. In the following description, the same reference numerals denote configurations which are the same as or similar to those in any of the first to third exemplary embodiments, and a description thereof will be omitted where appropriate. When effects which are the same as or similar to those in any of the first to third exemplary embodiments are obtained, a description of some details will also be omitted.

In particular, since the configuration of an entire information processing system 100 according to the specific example illustrated in FIG. 2 and the configuration of a computer 1000 for implementing a signal conversion module 103, information processing apparatus 105, and information processing apparatus 107 are the same as in the first exemplary embodiment, a description thereof will not be given.

(4.1 Overview)

In the first to third exemplary embodiments, an error is detected by comparing the correlation strengths of correlation models for pieces of normal data with those of correlation models for pieces of observed data. In the present exemplary embodiment, no correlation models are generated for pieces of observed data. Correlation models between respective sensing units 201 are generated from pieces of frequency data 208 that are pieces of normal data, predicted values are generated by applying pieces of observed data to the correlation models, and the predicted values are compared with actual measured values of the pieces of observed data to detect whether an error has occurred or not. In other words, an error is detected using prediction errors. As in the information processing system according to the present exemplary embodiment, with a method for detecting an error using prediction errors, not only variations over all frequencies but also a frequency range having a great prediction error can be clearly specified by displaying a prediction error in each frequency range. Pieces of sensor data having concentrated errors can be narrowed down as the root cause of an error by exhaustively performing such processing among a plurality of sensors.

In addition, with a method that uses prediction errors in error determination, the values of prediction errors used in error determination can be set as a rule with reference to prediction errors for pieces of normal data. With a method for detecting an error using prediction errors for a plurality of pieces of data, data having a larger width of change in the normal state allows detection of a subtler sign of an error, compared to error determination of a single piece of data on the basis of a threshold.

(4.2 System Configuration)

Figure 19:
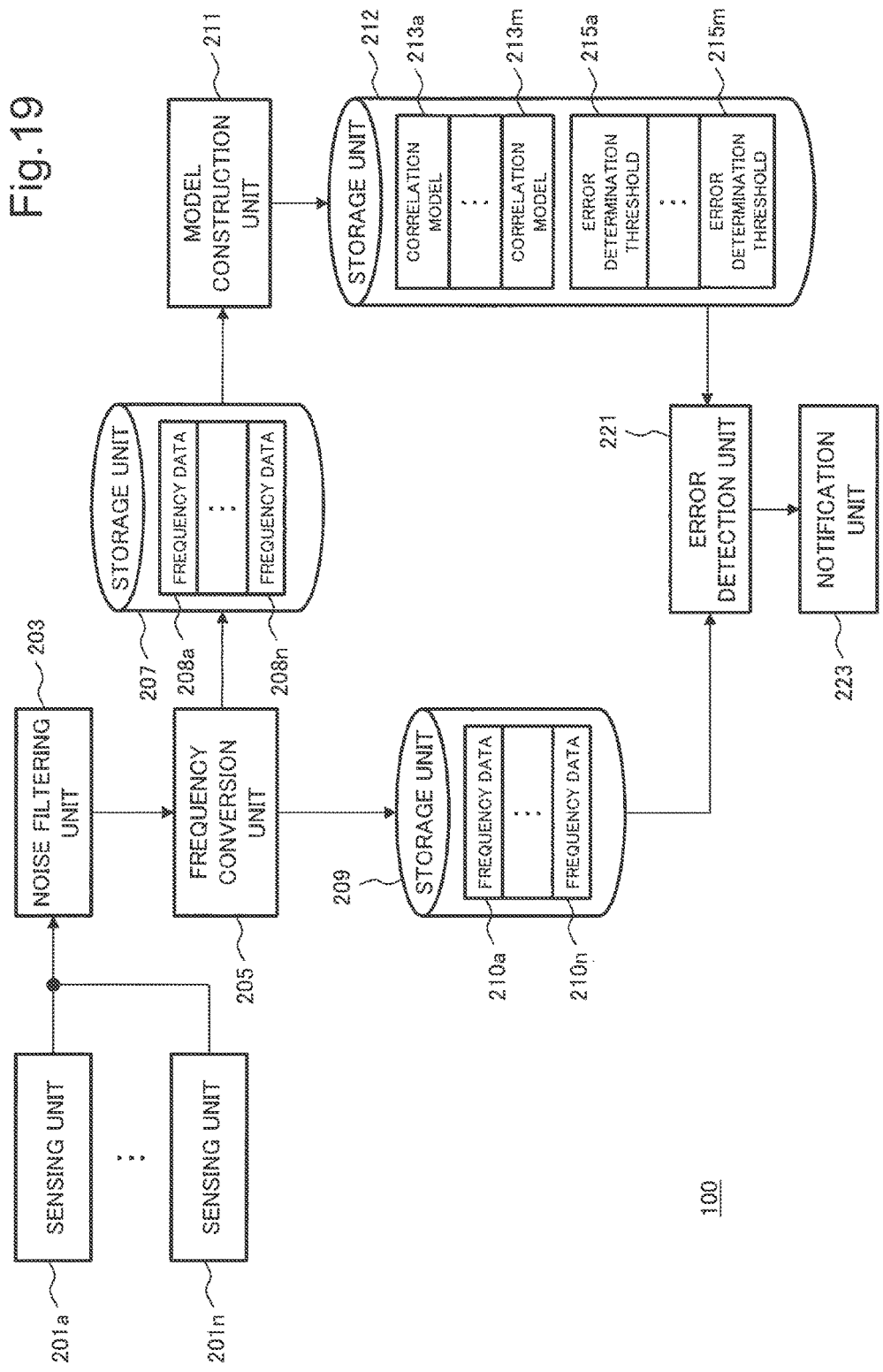
FIG. 19 is a block diagram illustrating a specific example of the functional configuration of an information processing system according to a fourth exemplary embodiment.

The configuration of the information processing system 100 according to the present exemplary embodiment will be described with reference to FIG. 19. The information processing system 100 includes sensing units 201a to 201n, a noise filtering unit 203, a frequency conversion unit 205, storage units 207 and 209, a model construction unit 211, a storage unit 212, an error detection unit 221, and a notification unit 223, as illustrated in FIG. 19.

The sensing units 201 detect vibration, light, or sounds and generate and output pieces of time-series data, as in the first to third exemplary embodiments. In the present exemplary embodiment, the sensing units 201 detect pieces of data at least at two timings: in the normal state and the state for which it is unclear whether the state is normal (a state targeted for error detection) or not. In the present exemplary embodiment, the number of sensing units 201 may be any number greater than one.

The noise filtering unit 203 removes noise from the pieces of time-series data output from the sensing units 201, as in the first to third exemplary embodiments. The frequency conversion unit 205 converts the pieces of time-series data that are respectively detected by the sensing units 201 and have their noise removed into pieces of frequency data 208 and 210. The pieces of frequency data 208 and 210 are, for example, pieces of data detected at different timings. The pieces of frequency data 208 are pieces of normal data obtained by conversion from pieces of time-series data in the normal state. The pieces of frequency data 210 are pieces of observed data (pieces of data targeted for error detection) obtained by conversion from pieces of time-series data in the state for which it is unclear whether the state is normal or not. The pieces of frequency data 208 and 210 are stored in the storage units 207 and 209, respectively.

The model construction unit 211 generates each of correlation models 213a to 213m from each combination of two pieces of frequency data from among pieces of frequency data 208a to 208n that are pieces of normal data, as in the first exemplary embodiment. The generated correlation models 213 are stored in the storage unit 212. The model construction unit 211 additionally stores a correlation strength 214 of each correlation model 213 in the storage unit 212.

The error detection unit 221 detects an error by applying the correlation model 213 stored in the storage unit 212 to the pieces of frequency data 210 (generated based on pieces of data detected by the sensing units 201 at different timings from the pieces of frequency data 208 that are pieces of normal data; and corresponding to pieces of observed data targeted for error detection) stored in the storage unit 209. For example, a predicted value at a frequency $f_0$ for the frequency data 208$i$ can be obtained by inputting values other than the value of the frequency $f_0$ of the frequency data 210$i$ and the value of each frequency of the frequency data 208$j$ to the correlation model 213 generated based on the pieces of frequency data 208$i$ and 208$j$. The error detection unit 221 can detect an error in accordance with, for example, whether the predicted value and an actual measured value of the frequency $f_0$ for the frequency data 208$i$ are greater than an error determination threshold 215. This processing can be performed for all frequencies of each piece of frequency data 210 and all combinations of the pieces of frequency data 210.

The notification unit 223 notifies the user of an error detection result obtained by the error detection unit 221. As a method for notification by the notification unit 223, the notification unit 223 may, for example, display a message on a display 111.

(4.3 Sequence of Processing)

Figure 20:
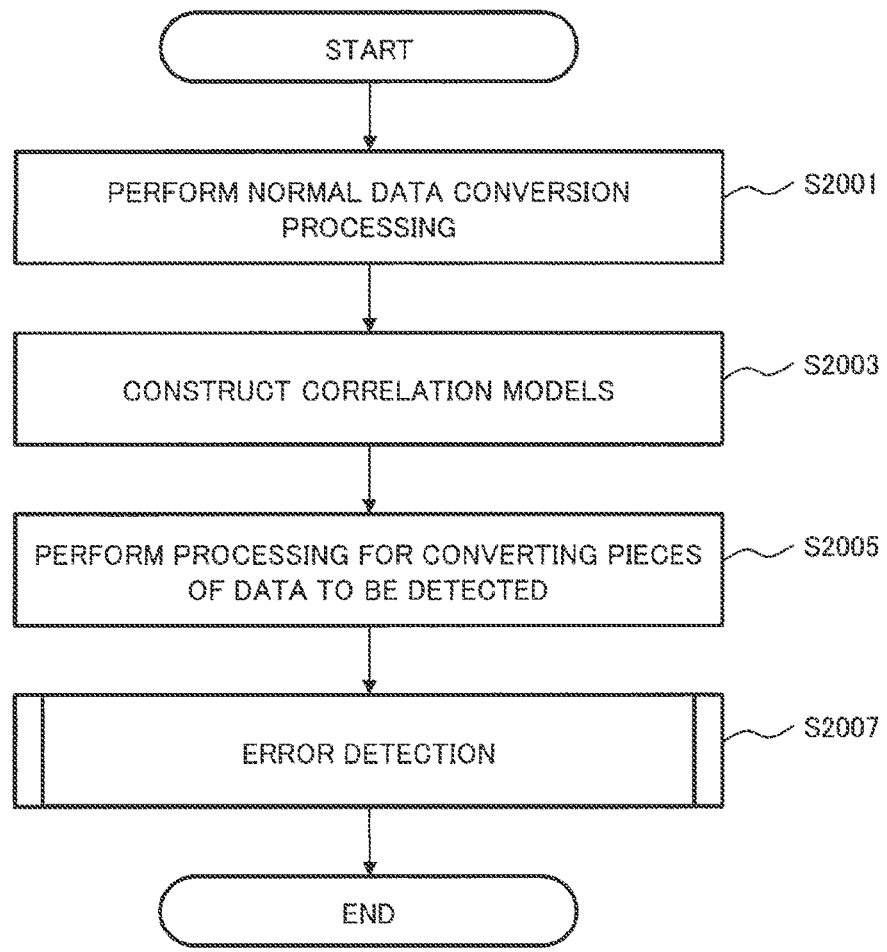
FIG. 20 is a flowchart illustrating the sequence of processing by the information processing system illustrated in FIG. 19.
Figure 21:
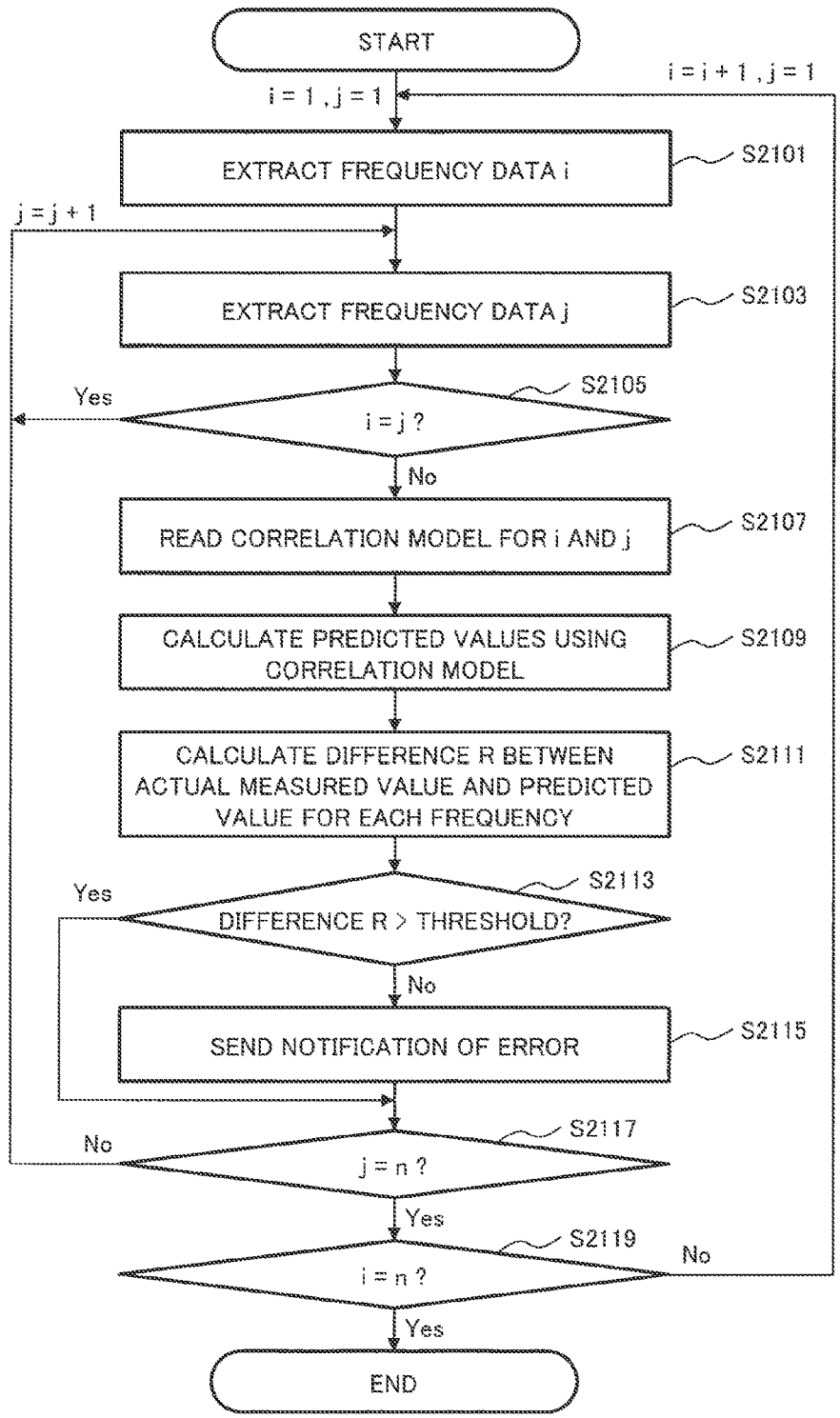
FIG. 21 is a flowchart illustrating the sequence of another processing by the information processing system illustrated in FIG. 19.

The sequence of processing by the information processing system 100 according to the present exemplary embodiment will be described below with reference to FIGS. 20 and 21. FIGS. 20 and 21 are flowcharts each illustrating the sequence of processing by the information processing system 100.

(4.3.1 Sequence of Overall Processing)

The sequence of the overall processing will be described first with reference to FIG. 20.

Pieces of normal time-series data detected by the sensing units 201 are converted into pieces of frequency data 208 by the frequency conversion unit 205 (step S2001) and the pieces of frequency data 208 are stored in the storage unit 207. The model construction unit 211 generates a correlation model 213 for each combination of pieces of frequency data 208$a$ to 208$n$ (step S2003).

Pieces of new time-series data to be detected, which are detected by the sensing units 201, are converted into pieces of frequency data 210 by the frequency conversion unit 205 (step S2005) and stored in the storage unit 209. The error detection unit 221 calculates predicted values by applying the correlation models 213 to the pieces of frequency data 210 and performs error detection processing based on the differences between the predicted values and actual measured values (pieces of frequency data 210) (step S2007).

The processes in steps S2001, S2003, and S2005 are the same as the processes in steps S501, S503, and S505, respectively, described with reference to FIG. 5 in the first exemplary embodiment. The process in step S2007 will be described below with reference to FIG. 21.

(4.3.2 Error Detection Processing)

The sequence of error detection processing will be described with reference to FIG. 21. A flowchart illustrated in FIG. 21 corresponds to the process in step S2007 of FIG. 20.

The error detection unit 221 processes the pieces of frequency data 210 targeted for error detection. First, the error detection unit 221 sets i and j to 1 and extracts the pieces of frequency data 210$i$ and 210$j$ (the pieces of frequency data 210 generated from the pieces of time-series data extracted by the i-th and j-th sensing units 201, respectively) from the storage unit 209 (steps S1201 & S2103). If i and j are equal to each other (Yes in step S2105), the error detection unit 221 increments the value of j and extracts the frequency data 210$j$ again (step S2103).

If i and j are different from each other (No in step S1205), the error detection unit 221 reads, from the storage unit 212, the correlation model 213 generated based on the pieces of frequency data 208$i$ and 208$j$ for the sensing units 201$i$ and 201$j$ (step S1207). The error detection unit 221 calculates a predicted value for each frequency using the correlation model 213 (step S2109). The error detection unit 221 further calculates a difference R between the predicted value and an actual measured value for each frequency (step S2111). If the difference R is greater than the error determination threshold 215 (Yes in step S2113), the error detection unit 221 uses the notification unit 223 to send a notification that a sign of an error has appeared for the frequencies in question, or send a notification of a prediction error in each frequency range (step S2115).

The notification unit 223 may employ a variety of methods for notification. The notification unit 223 may, for example, display a numerical value on the display 111. Alternatively, histograms of actual measured values and predicted values or the differences between these values (that is, prediction errors) may be displayed on the display 111 in graph form.

The error detection unit 221 performs the above-mentioned processing for all combinations of the pieces of frequency data 210 while incrementing i and j until their values reach n.

After completion of processing for all combinations of the pieces of frequency data 210, the error detection unit 221 may list sensing units 201 included in large numbers in correlations having a difference R greater than the error determination threshold 215 (that is, combinations expected to have broken correlations due to the occurrence of an error). This makes it possible to narrow down sensing units 201 likely to have an error.

The error detection unit 221 may calculate the total number of correlation models 213 determined to have errors, as an error score for each frequency, and use the notification unit 223 to provide a notification of this score. With this function, in all sensing units 201 used, the number of repetitions of error determination for each frequency is clearly specified, thereby providing the user with information for matching between the frequencies and error phenomena.

(4.4 Advantageous Effect according to Present Exemplary Embodiment)

As described above, the information processing system 100 according to the present exemplary embodiment models correlation between the sensing units 201, using the pieces of frequency data 208, for pieces of time-series data which are detected by the sensing units 201 and show distinctive changes in frequency. In this manner, the information processing system 100 according to the present exemplary embodiment identifies correlation not as correlation coefficients but as correlation models 213 and can therefore determine the normal or error state for the pieces of sensor data on the basis of changes in correlation.

In other words, the information processing system 100 according to the present exemplary embodiment is capable of satisfactory data analysis.

(5 Fifth Exemplary Embodiment)

A fifth exemplary embodiment will be described below. In the following description, the same reference numerals denote configurations which are the same as or similar to those in any of the first to fourth exemplary embodiments, and a description thereof will be omitted where appropriate. When effects which are the same as or similar to those in any of the first to fourth exemplary embodiments are obtained, a description of some details will also be omitted.

In particular, since the configuration of an entire information processing system 100 according to the specific example illustrated in FIG. 2 and the configuration of a computer 1000 for implementing a signal conversion module 103, information processing apparatus 105, and information processing apparatus 107 are the same as in the first exemplary embodiment, a description thereof will not be given.

(5.1 Overview)

In the fourth exemplary embodiment, an error is detected by generating a correlation model for each combination of pieces of frequency data 208 and applying pieces of frequency data 210 to the correlation models. In the present exemplary embodiment, average frequency data 228 of pieces of frequency data 208 is generated to generate correlation models 213 between the average frequency data 228 and each of the pieces of frequency data 208. Average frequency data 230 of pieces of frequency data 210 that are pieces of observed data is further generated, and the average frequency data 230 and the pieces of frequency data 210 are applied to the correlation models 213 to generate predicted values for the pieces of frequency data 210. An error detection unit 221 detects whether an error has occurred on the basis of the differences between the predicted values and the pieces of frequency data 210.

(5.2 System Configuration)

Figure 22:
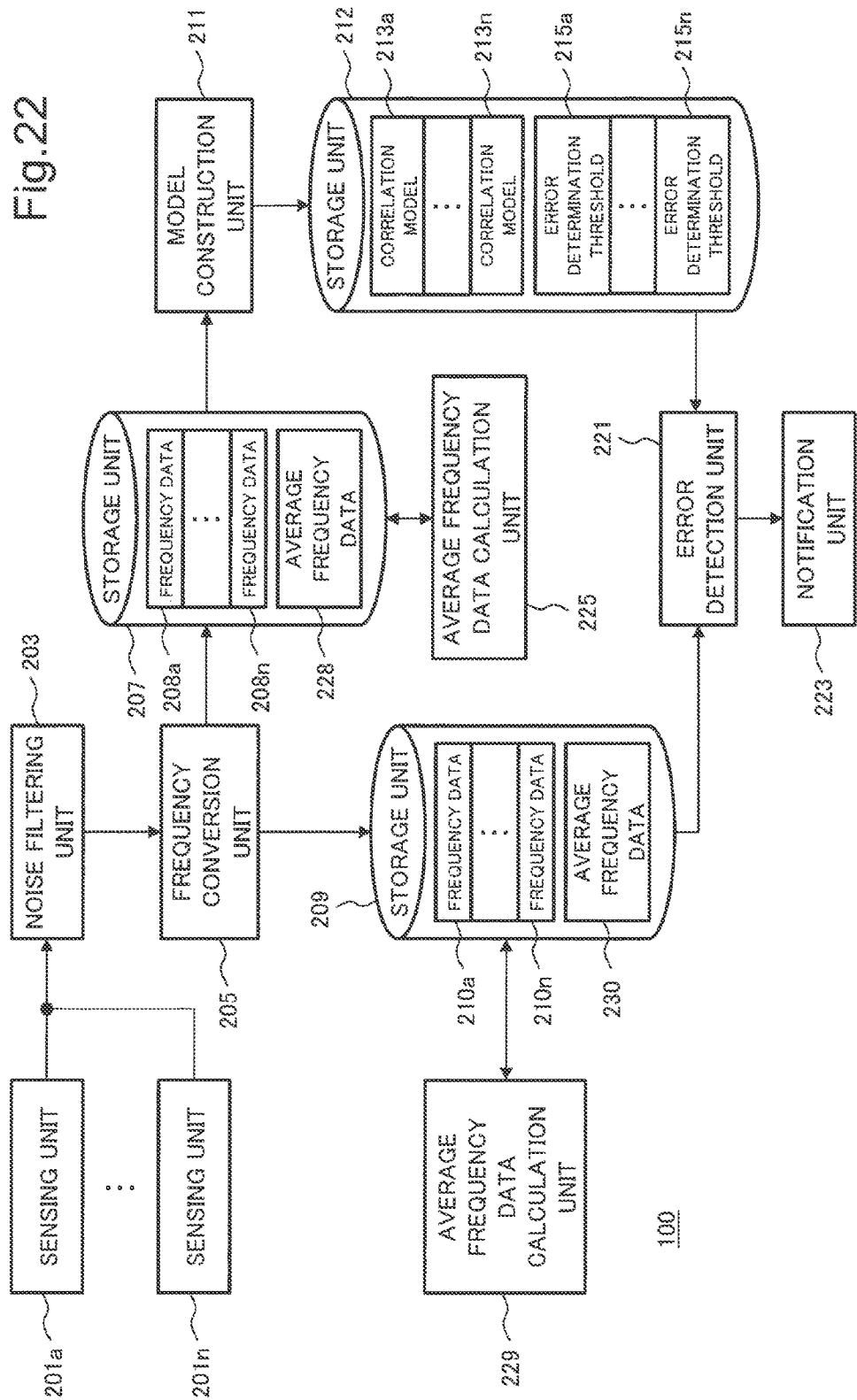
FIG. 22 is a block diagram illustrating a specific example of the functional configuration of an information processing system according to a fifth exemplary embodiment.

The configuration of the information processing system 100 according to the present exemplary embodiment will be described with reference to FIG. 22. The information processing system 100 includes average frequency data calculation units 225 and 229 as well as the configuration of the information processing system 100 according to the fourth exemplary embodiment, as illustrated in FIG. 22. Storage units 207 and 209 respectively store pieces of average frequency data 228 and 229 calculated by the average frequency data calculation units 225 and 229.

Since the operations of sensing units 201, a noise filtering unit 203, a frequency conversion unit 205, and a notification unit 223 are the same as in the fourth exemplary embodiment, a description thereof will not be given herein.

The average frequency data calculation unit 225 calculates the average of the pieces of frequency data 208 for each frequency to generate average frequency data 228 that is the average data of pieces of normal data. The calculated average frequency data 228 is stored in the storage unit 207.

A model construction unit 211 generates correlation models 213a to 213n between the average frequency data 228 and respective pieces of frequency data 208a to 208n that are pieces of normal data. The generated correlation models 213 are stored in a storage unit 212.

The average frequency data calculation unit 229 calculates the average of the pieces of frequency data 208 for each frequency to generate average frequency data 230 that is the average data of pieces of normal data, like the average frequency data 228. The calculated average frequency data 230 is stored in the storage unit 209.

The error detection unit 221 detects an error by applying the pieces of frequency data 210 and the average frequency data 230 stored in the storage unit 209 to the correlation models 213. For example, a predicted value at a frequency $f_0$ for the frequency data 210$i$ can be obtained by inputting the value of each frequency of the average frequency data 230 and the values of the frequency data 208$j$ other than the value of the frequency $f_0$ to the correlation model 213$i$ generated from the frequency data 208$i$ and the average frequency data 228. The error detection unit 221 can detect an error in accordance with, for example, whether the predicted value and an actual measured value of the frequency $f_0$ for the frequency data 210$i$ are greater than an error determination threshold 215. This processing can be performed for all frequencies of each piece of frequency data 210 and all pieces of frequency data 210.

(5.3 Sequence of Processing)

Figure 23:
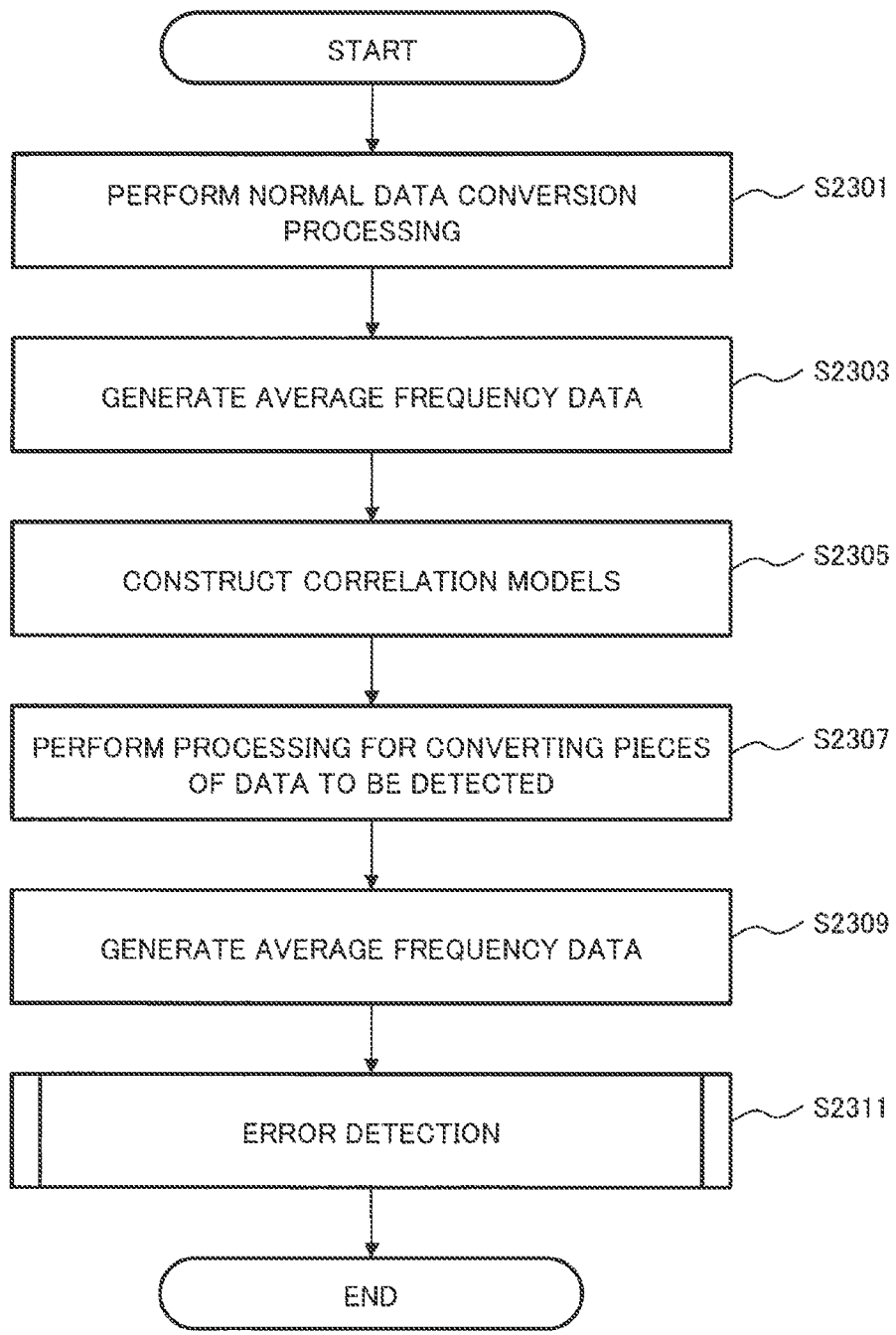
FIG. 23 is a flowchart illustrating the sequence of processing by the information processing system illustrated in FIG. 22.

The sequence of processing by the information processing system 100 according to the present exemplary embodiment will be described below with reference to FIGS. 23 and 24. FIGS. 23 and 24 are flowcharts each illustrating the sequence of processing by the information processing system 100.

(5.3.1 Sequence of Overall Processing)

The sequence of the overall processing will be described first with reference to FIG. 23.

Pieces of normal time-series data detected by the sensing units 201 are converted into pieces of frequency data 208 by the frequency conversion unit 205 (step S2301) and the pieces of frequency data 208 are stored in the storage unit 207. The average frequency data calculation unit 225 calculates average frequency data 228 that is the average data of the pieces of frequency data 208 stored in the storage unit 207 (step S2303). The model construction unit 211 generates a correlation model 213 between each piece of frequency data 208 and the average frequency data 228 (step S2305).

Pieces of new time-series data to be detected, which are detected by the sensing units 201, are converted into pieces of frequency data 210 by the frequency conversion unit 205 (step S2305) and the pieces of frequency data 210 are stored in the storage unit 209. The average frequency data calculation unit 229 calculates average frequency data 230 that is the average data of the pieces of frequency data 210 stored in the storage unit 209 (step S2309). The error detection unit 221 calculates predicted values by applying the correlation models 213 to combinations of the pieces of frequency data 210 and the average frequency data 230, and performs error detection processing based on the differences between the predicted values and actual measured values (pieces of frequency data 210) (step S2311).

The processes in steps S2301 and S2307 are the same as the processes described with reference to FIG. 6 in the first exemplary embodiment. The process in step S2305 is the same as the process described with reference to FIG. 15 in the second exemplary embodiment.

(5.3.2 Error Detection Processing)

The sequence of error detection processing will be described with reference to FIG. 24. A flowchart illustrated in FIG. 24 corresponds to the process in step S2311 of FIG. 23.

First, the error detection unit 221 sets i to 1, reads the average frequency data 230 (step S2401), and reads the frequency data 210$i$ from the storage unit 209 (step S2403). The error detection unit 221 further reads the correlation model 213$i$ generated from the average frequency data 228 and the frequency data 208$i$ for the sensing unit 201$i$ commonly used to obtain the frequency data 210$i$ (step S2405). The error detection unit 221 calculates a predicted value for the frequency data 210$i$ at each frequency by applying the average frequency data 230 and the frequency data 210*i* to the read correlation model 213*i* (step S2407). The error detection unit 221 further calculates a difference R between the predicted value and an actual measured value of the frequency data 210*i* for each frequency (step S2409). If the difference R is greater than an error determination threshold 215*i* (Yes in step S2411), the error detection unit 221 uses the notification unit 223 to send a notification that a sign of an error has appeared for the frequencies in question, or send a notification of a prediction error in each frequency range (step S2415).

The notification unit 223 may employ a variety of methods for notification. The notification unit 223 may, for example, display a message on a display 111. Alternatively, histograms of actual measured values and predicted values, or the differences between these values (that is, prediction errors) may be displayed on the display 111 in graph form.

The error detection unit 221 performs the above-mentioned processing for all pieces of frequency data 210 while incrementing i until its value reaches n.

The error detection unit 221 may calculate the total number of correlation models 213 determined to have errors, as an error score for each frequency, and use the notification unit 223 to provide a notification of this score. With this function, in all sensing units 201 used, the number of repetitions of error determination for each frequency is clearly specified, thereby providing the user with information for matching between the frequencies and error phenomena.

(5.4 Advantageous Effect according to Present Exemplary Embodiment)

As described above, the information processing system 100 according to the present exemplary embodiment models correlation between each of the sensing units 201 and the average frequency data 228, using the pieces of frequency data 208, for pieces of time-series data which are detected by the sensing units 201 and show distinctive changes in frequency. In this manner, the information processing system 100 according to the present exemplary embodiment identifies correlation not as correlation coefficients but as correlation models 213 and can therefore determine the normal or error state for the pieces of sensor data on the basis of changes in correlation.

In other words, the information processing system 100 according to the present exemplary embodiment is capable of satisfactory data analysis.

(6 Supplementary Notes)

The arrangements according to the above-mentioned exemplary embodiments may be combined with each other or some of them may be interchanged with each other. The arrangements of the present invention are not limited to the above-mentioned exemplary embodiments and may be applied with various changes without departing from the gist of the present invention.

The whole or part of the exemplary embodiments disclosed above can be described as, but not limited to, the following supplementary notes. The program according to the present invention may be a program causing a computer to perform the respective operations described in each of the above-mentioned exemplary embodiments.

(Supplementary Note 1)

An information processing system including: a conversion means for converting a plurality of pieces of time-series data obtained through detection carried out by a plurality of sensors into pieces of first frequency data, respectively; a first model generation means for generating a first correlation model using pieces of the first frequency data for at least two sensors from among the plurality of sensors; a first calculation means for calculating a correlation strength of the first correlation model; and a determination means for determining whether an error has occurred based on the correlation strength.

(Supplementary Note 2)

The information processing system according to supplementary note 1, wherein the first model generation means generates the first correlation model using a combination of pieces of the first frequency data for two sensors from among the plurality of sensors.

(Supplementary Note 3)

The information processing system according to supplementary note 1, wherein the first model generation means generates the first correlation model using average frequency data representing an average of a plurality of pieces of the first frequency data for the plurality of sensors, and a piece of the first frequency data from among the plurality of pieces of the first frequency data.

(Supplementary Note 4)

The information processing system according to any one of supplementary notes 1 to 3, further including: a conversion means for converting pieces of time-series data obtained through detection carried out by the plurality of sensors into pieces of second frequency data; a second model generation means for generating a second correlation model using pieces of the second frequency data; and a second calculation means for calculating a correlation strength of the second correlation model, wherein the determination means determines whether an error has occurred based on a comparison between the correlation strength of the first correlation model and the correlation strength of the second correlation model.

(Supplementary Note 5)

The information processing system according to supplementary note 4, wherein the second model generation means generates the second correlation model using a combination of pieces of the second frequency data for two sensors from among the plurality of sensors.

(Supplementary Note 6)

The information processing system according to supplementary note 4, wherein the second model generation means generates the second correlation model using average frequency data representing an average of a plurality of pieces of the first frequency data for the plurality of sensors, and a piece of the second frequency data.

(Supplementary Note 7)

The information processing system according to any one of supplementary notes 4 to 6, wherein the pieces of time-series data for the pieces of first frequency data and the pieces of time-series data for the pieces of second frequency data are detected at different timings by the plurality of sensors.

(Supplementary Note 8)

The information processing system according to any one of supplementary notes 4 to 6, wherein the pieces of time-series data for the pieces of first frequency data and the pieces of time-series data for the pieces of second frequency data are detected by different sensors from among the plurality of sensors.

(Supplementary Note 9)

The information processing system according to any one of supplementary notes 1 to 8, wherein the pieces of frequency data used in generating the first correlation model is applied to the first correlation model to generate a threshold used to determine whether an error has occurred.

(Supplementary Note 10)

An information processing system including: a conversion means for converting a plurality of pieces of time-series data obtained through detection carried out by a plurality of sensors into pieces of first frequency data, respectively; a model generation means for generating a correlation model using pieces of the first frequency data for at least two sensors from among the plurality of sensors; and a determination means for determining to whether an error has occurred based on a difference between a predicted value of a piece of second frequency data and an actual measured value of the piece of second frequency data, the predicted value of the piece of the second frequency data being obtained by applying the piece of the second frequency data to the correlation model, the piece of the second frequency data being obtained by converting another piece of time-series data obtained from a sensor with respect to the correlation model.

(Supplementary Note 11)

The information processing system according to supplementary note 10, wherein the model generation means generates the correlation model using a combination of pieces of the first frequency data for two sensors from among the plurality of sensors.

(Supplementary Note 12)

The information processing system according to supplementary note 10, wherein the first model generation means generates the correlation model using first average frequency data representing an average of a plurality of pieces of the first frequency data for the plurality of sensors, and a piece of the first average frequency data from among the plurality of pieces of the first frequency data.

(Supplementary Note 13)

The information processing system according to supplementary note 12, wherein the determination means determines whether an error has occurred based on a difference between the predicted value of the piece of second frequency data and the actual measured value of the piece of second frequency data, the predicted value of the piece of the second frequency data being obtained by applying, to the correlation model, the piece of the to second frequency data with respect to the correlation model and second average frequency data representing an average of a plurality of pieces of the second frequency data for the plurality of sensors.

(Supplementary Note 14)

The information processing system according to any one of supplementary notes 10 to 13, wherein the pieces of frequency data used in generating the correlation model is applied to the correlation model to generate a threshold used to determine whether an error has occurred.

(Supplementary Note 15)

An information processing method performed by an information processing system including: a step for converting a plurality of pieces of time-series data obtained through detection carried out by a plurality of sensors into pieces of first frequency data, respectively; a step for generating a first correlation model using pieces of the first frequency data for at least two sensors from among the plurality of sensors; a step for calculating a correlation strength of the first correlation model; and a step for determining whether an error has occurred based on the correlation strength.

(Supplementary Note 16)

The information processing method according to supplementary note 15, wherein the step for generating the first correlation model generates the first correlation model using a combination of pieces of the first frequency data for two sensors from among the plurality of sensors.

(Supplementary Note 17)

The information processing method according to supplementary note 15, wherein the step for generating the first correlation model generates the first correlation model using average frequency data representing an average of a plurality of pieces of the first frequency data for the plurality of sensors, and a piece of the first frequency data from among the plurality of pieces of the first frequency data.

(Supplementary Note 18)

The information processing method according to any one of supplementary notes 15 to 17, further including: a step for converting pieces of time-series data obtained through detection carried out by the plurality of sensors into pieces of second frequency data; a step for generating a second correlation model using pieces of the second frequency data; and a step for calculating a correlation strength of the second correlation model, wherein the step for determining determines whether an error has occurred based on a comparison between the correlation strength of the first correlation model and the correlation strength of the second correlation model.

(Supplementary Note 19)

The information processing method according to supplementary note 18, wherein the step for generating the second correlation model generates the second correlation model using a combination of pieces of the second frequency data for two sensors from among the plurality of sensors.

(Supplementary Note 20)

The information processing method according to supplementary note 18, wherein the step for generating the first correlation model generates the second correlation model using average frequency data representing an average of a plurality of pieces of the first frequency data for the plurality of sensors, and a piece of the second frequency data.

(Supplementary Note 21)

The information processing method according to any one of supplementary notes 18 to 20, wherein the pieces of time-series data for the pieces of first frequency data and the pieces of time-series data for the pieces of second frequency data are detected at different timings by the plurality of sensors.

(Supplementary Note 22)

The information processing method according to any one of supplementary notes 18 to 20, wherein the pieces of time-series data for the pieces of first frequency data and the pieces of time-series data for the pieces of second frequency data are detected by different sensors from among the plurality of sensors.

(Supplementary Note 23)

The information processing method according to any one of supplementary notes 15 to 22, wherein the pieces of frequency data used in generating the first correlation model is applied to the first correlation model to generate a threshold used to determine whether an error has occurred.

(Supplementary Note 24)

An information processing method performed by an information processing system including: a step for converting a plurality of pieces of time-series data obtained through detection carried out by a plurality of sensors into pieces of first frequency data, respectively; a step for generating a correlation model using pieces of the first frequency data for at least two sensors from among the plurality of sensors; and a step for determining whether an error has occurred based on a difference between a predicted value of a piece of second frequency data and an actual measured value of the piece of second frequency data, the predicted value of the piece of the second frequency data being obtained by applying the piece of the second frequency data to the correlation model, the piece of the second frequency data being obtained by converting another piece of time-series data obtained from a sensor with respect to the correlation model.

(Supplementary Note 25)

The information processing method according to supplementary note 24, wherein the step for generating generates the correlation model using a combination of pieces of the first frequency data for two sensors from among the plurality of sensors.

(Supplementary Note 26)

The information processing method according to supplementary note 24, wherein the step for generating generates the correlation model using first average frequency data representing an average of a plurality of pieces of the first frequency data for the plurality of sensors, and a piece of the first average frequency data from among the plurality of pieces of the first frequency data.

(Supplementary Note 27)

The information processing method according to supplementary note 26, wherein the step for determining determines whether an error has occurred based on a difference between the predicted value of the piece of second frequency data and the actual measured value of the piece of second frequency data, the predicted value of the piece of the second frequency data being obtained by applying, to the correlation model, the piece of the second frequency data with respect to the correlation model and second average frequency data representing an average of a plurality of pieces of the second frequency data for the plurality of sensors.

(Supplementary Note 28)

The information processing method according to any one of supplementary notes 24 to 27, wherein the pieces of frequency data used in generating the correlation model is applied to the correlation model to generate a threshold used to determine whether an error has occurred.

(Supplementary Note 29)

A program causing a computer to execute processes including: a process for converting a plurality of pieces of time-series data obtained through detection carried out by a plurality of sensors into pieces of first frequency data, respectively; a process for generating a first correlation model using pieces of the first frequency data for at least two sensors from among the plurality of sensors; a process for calculating a correlation strength of the first correlation model; and a process for determining whether an error has occurred based on the correlation strength.

(Supplementary Note 30)

The program according to supplementary note 29, wherein the process for generating the first correlation model generates the first correlation model using a combination of pieces of the first frequency data for two sensors from among the plurality of sensors.

(Supplementary Note 31)

The program according to supplementary note 29, wherein the process for generating the first correlation model generates the first correlation model using average frequency data representing an average of a plurality of pieces of the first frequency data for the plurality of sensors, and a piece of the first frequency data from among the plurality of pieces of the first frequency data.

(Supplementary Note 32)

The program according to any one of supplementary notes 29 to 31, further including: a process for converting pieces of time-series data obtained through detection carried out by the plurality of sensors into pieces of second frequency data; a process for generating a second correlation model using pieces of the second frequency data; and a process for calculating a correlation strength of the second correlation model, wherein the process for determining determines whether an error has occurred based on a comparison between the correlation strength of the first correlation model and the correlation strength of the second correlation model.

(Supplementary Note 33)

The program according to supplementary note 32, wherein the process for generating the second correlation model generates the second correlation model using a combination of pieces of the second frequency data for two sensors from among the plurality of sensors.

(Supplementary Note 34)

The program according to supplementary note 32, wherein the process for generating the first correlation model generates the second correlation model using average frequency data representing an average of a plurality of pieces of the first frequency data for the plurality of sensors, and a piece of the second frequency data.

(Supplementary Note 35)

The program according to any one of supplementary notes 32 to 34, wherein the pieces of time-series data for the pieces of first frequency data and the pieces of time-series data for the pieces of second frequency data are detected at different timings by the plurality of sensors.

(Supplementary Note 36)

The program according to any one of supplementary notes 32 to 34, wherein the pieces of time-series data for the pieces of first frequency data and the pieces of time-series data for the pieces of second frequency data are detected by different sensors from among the plurality of sensors.

(Supplementary Note 37)

The program according to any one of supplementary notes 29 to 36, wherein the pieces of frequency data used in generating the first correlation model is applied to the first correlation model to generate a threshold used to determine whether an error has occurred.

(Supplementary Note 38)

A program causing a computer to execute processes including: a process for converting a plurality of pieces of time-series data obtained through detection carried out by a plurality of sensors into pieces of first frequency data, respectively; a process for generating a correlation model using pieces of the first frequency data for at least two sensors from among the plurality of sensors; and a process for determining whether an error has occurred based on a difference between a predicted value of a piece of second frequency data and an actual measured value of the piece of second frequency data, the predicted value of the piece of the second frequency data being obtained by applying the piece of the second frequency data to the correlation model, the piece of the second frequency data being obtained by converting another piece of time-series data obtained from a sensor with respect to the correlation model.

(Supplementary Note 39)

The program according to supplementary note 38, wherein the process for generating generates the correlation model using a combination of pieces of the first frequency data for two sensors from among the plurality of sensors.

(Supplementary Note 40)

The program according to supplementary note 38, wherein the process for generating generates the correlation model using first average frequency data representing an average of a plurality of pieces of the first frequency data for the plurality of sensors, and a piece of the first average frequency data from among the plurality of pieces of the first frequency data.

(Supplementary Note 41)

The program according to supplementary note 40, wherein the process for determining determines whether an error has occurred based on a difference between the predicted value of the piece of second frequency data and the actual measured value of the piece of second frequency data, the predicted value of the piece of the second frequency data being obtained by applying, to the correlation model, the piece of the second frequency data with respect to the correlation model and second average frequency data representing an average of a plurality of pieces of the second frequency data for the plurality of sensors.

(Supplementary Note 42)

The program according to any one of supplementary notes 38 to 41, wherein the pieces of frequency data used in generating the correlation model is applied to the correlation model to generate a threshold used to determine whether an error has occurred.

This application is based upon and claims the benefit of priority from Japanese Patent Application No. 2013-185947, filed on Sep. 9, 2013, the disclosure of which is incorporated herein in its entirety by reference.

REFERENCE SIGNS LIST

100: information processing system
101: vibration sensor
103: signal conversion module
105: information processing apparatus
107: information processing apparatus
109: storage medium
111: display
201: sensing unit
203: noise filtering unit
205: frequency conversion unit
207: storage unit
208: frequency data
209: storage unit
210: frequency data
211: model construction unit
212: storage unit
213: correlation model
214: correlation model
215: error determination threshold
217: correlation strength average/maximum deviation calculation unit
219: model construction unit
221: error detection unit
223: notification unit
225: average frequency data calculation unit
227: storage unit
228: average frequency data
229: average frequency data calculation unit
230: average frequency data
1000: computer
1001: processor
1003: memory
1005: storage device
1007: input interface
1009: data interface
1011: communication interface
1013: display device

The invention claimed is:

1. An information processing system comprising:
a memory storing instructions, and
one or more processors configured to execute the instructions to:
convert a plurality of pieces of time-series data obtained through detection carried out by a plurality of sensors into pieces of first frequency data and second frequency data, respectively;
generate a first correlation model using pieces of the first frequency data for at least two sensors from among the plurality of sensors;
calculate a correlation strength of the first correlation model representing a prediction error of the first correlation model based on the first correlation model and the first frequency data obtained from the sensor by which the data used to generate the first correlation model has been measured;
generate a second correlation model using pieces of the second frequency data;
calculate a correlation strength of the second correlation model; and
determine whether an error has occurred based on the correlation strength of the first correlation model and the second correlation model;
wherein whether an error has occurred is determined based on a comparison between the correlation strength of the first correlation model and the correlation strength of the second correlation model.

2. The information processing system according to claim 1, wherein the first correlation model is generated using a combination of pieces of the first frequency data for two sensors from among the plurality of sensors.

3. The information processing system according to claim 1, wherein the first correlation model is generated using average frequency data representing an average of a plurality of pieces of the first frequency data for the plurality of sensors, and a piece of the first frequency data from among the plurality of pieces of the first frequency data.

4. The information processing system according to claim 1, wherein the second correlation model is generated using a combination of pieces of the second frequency data for two sensors from among the plurality of sensors.

5. The information processing system according to claim 1, wherein the second correlation model is generated using average frequency data representing an average of a plurality of pieces of the first frequency data for the plurality of sensors, and a piece of the second frequency data.

6. The information processing system according to claim 1, wherein the pieces of time-series data for the pieces of first frequency data and the pieces of time-series data for the pieces of second frequency data are detected at different timings by the plurality of sensors.

7. The information processing system according to claim 1, wherein the pieces of time-series data for the pieces of first frequency data and the pieces of time-series data for the pieces of second frequency data are detected by different sensors from among the plurality of sensors.

8. The information processing system according to claim 1, wherein the pieces of frequency data used in generating the first correlation model is applied to the first correlation model to generate a threshold used to determine whether an error has occurred.

9. An information processing method performed by an information processing system comprising:
- converting a plurality of pieces of time-series data obtained through detection carried out by a plurality of sensors into pieces of first frequency data and second frequency data, respectively;
- generating a first correlation model using pieces of the first frequency data for at least two sensors from among the plurality of sensors;
- calculating a correlation strength of the first correlation model representing a prediction error of the first correlation model based on the first correlation model and the first frequency data obtained from the sensor by which the data used to generate the first correlation model has been measured;
- generating a second correlation model using pieces of the second frequency data;
- calculating a correlation strength of the second correlation model; and
- determining whether an error has occurred based on the correlation strength of the first correlation model and the second correlation model;
- wherein whether an error has occurred is determined based on a comparison between the correlation strength of the first correlation model and the correlation strength of the second correlation model.

10. A non-transitory computer readable storage medium recording thereon a program causing a computer to perform a method comprising:
- converting a plurality of pieces of time-series data obtained through detection carried out by a plurality of sensors into pieces of first frequency data and second frequency data, respectively;
- generating a first correlation model using pieces of the first frequency data for at least two sensors from among the plurality of sensors;
- calculating a correlation strength of the first correlation model representing a prediction error of the first correlation model based on the first correlation model and the first frequency data obtained from the sensor by which the data used to generate the first correlation model has been measured;
- generating a second correlation model using pieces of the second frequency data;
- calculating a correlation strength of the second correlation model; and
- determining whether an error has occurred based on the correlation strength of the first correlation model and the second correlation model;
- wherein whether an error has occurred is determined based on a comparison between the correlation strength of the first correlation model and the correlation strength of the second correlation model.

* * * * *